United States Patent
Kim et al.

(10) Patent No.: US 12,074,960 B2
(45) Date of Patent: Aug. 27, 2024

(54) ELECTRONIC DEVICE AND METHOD FOR ELECTRONIC DEVICE PROCESSING RECEIVED DATA PACKET

(71) Applicant: Samsung Electronics Co., Ltd., Suwon-si (KR)

(72) Inventors: Youngwook Kim, Suwon-si (KR); Wonbo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/986,315

(22) Filed: Nov. 14, 2022

(65) Prior Publication Data
US 2023/0072048 A1 Mar. 9, 2023

Related U.S. Application Data

(63) Continuation of application No. PCT/KR2021/005800, filed on May 10, 2021.

(30) Foreign Application Priority Data

May 11, 2020 (KR) .......................... 10-2020-0055901

(51) Int. Cl.
*H04L 69/166* (2022.01)
*H04L 47/30* (2022.01)
(Continued)

(52) U.S. Cl.
CPC ............ *H04L 69/166* (2013.01); *H04L 47/30* (2013.01); *H04L 47/41* (2013.01); *H04L 47/564* (2013.01);
(Continued)

(58) Field of Classification Search
CPC ....... H04L 47/18; H04L 47/19; H04L 47/193; H04L 47/263; H04L 47/37; H04L 47/43;
(Continued)

(56) References Cited

U.S. PATENT DOCUMENTS 7,165,129 B1 1/2007 Okmianski et al.
7,921,328 B1 4/2011 Gulati et al.
(Continued)

FOREIGN PATENT DOCUMENTS

JP 2014-143744 A 8/2014
KR 10-2009-0033396 A 4/2009
(Continued)

*Primary Examiner* — Vivek Srivastava
*Assistant Examiner* — William C McBeth
(74) *Attorney, Agent, or Firm* — Jefferson IP Law, LLP

(57) ABSTRACT

An electronic device is provided. The electronic device includes a network connection device, at least one processor, and a memory operably connected to the at least one processor, wherein the memory store instructions which are configured to, when executed, control the electronic device to receive a data packet from the network connection device, identify an Internet protocol (IP) type of a server, based on header information of the received data packet, identify information related to packet mergence set according to the identified IP type of the server and an IP type of the electronic device, and merge the data packets received from the network connection device or flush the data packets as a network stack, based on the identified information related to the packet mergence.

18 Claims, 19 Drawing Sheets

(51) Int. Cl.
  *H04L 47/41* (2022.01)
  *H04L 47/56* (2022.01)
  *H04L 61/2503* (2022.01)
  *H04L 69/167* (2022.01)
  *H04L 69/22* (2022.01)

(52) U.S. Cl.
  CPC ........ *H04L 61/2503* (2013.01); *H04L 69/167* (2013.01); *H04L 69/22* (2013.01)

(58) Field of Classification Search
  CPC ............... H04L 61/2503; H04L 61/251; H04L 61/2514; H04L 61/2525; H04L 69/16; H04L 69/161; H04L 69/166; H04L 69/167; H04L 69/22
  See application file for complete search history.

(56) References Cited

U.S. PATENT DOCUMENTS

| | | | |
|---|---|---|---|
| 10,880,264 B1* | 12/2020 | Chakravarthy Dandangi | H04L 61/251 |
| 2006/0104303 A1* | 5/2006 | Makineni | H04L 69/166 370/463 |
| 2007/0022212 A1* | 1/2007 | Fan | H04L 69/166 709/238 |
| 2007/0064737 A1* | 3/2007 | Williams | H04L 69/161 370/473 |
| 2007/0076623 A1* | 4/2007 | Aloni | H04L 69/166 370/254 |
| 2008/0181220 A1 | 7/2008 | Babbar et al. | |
| 2008/0232364 A1 | 9/2008 | Beverly | |
| 2010/0095007 A1 | 4/2010 | Cherian et al. | |
| 2011/0307629 A1* | 12/2011 | Haddad | H04L 69/167 709/245 |
| 2012/0134343 A1 | 5/2012 | Farley et al. | |
| 2013/0080574 A1* | 3/2013 | Prince | H04L 61/59 709/217 |
| 2013/0205037 A1* | 8/2013 | Biswas | H04L 47/193 709/232 |
| 2013/0332584 A1* | 12/2013 | Sun | H04L 69/167 709/219 |
| 2014/0280857 A1 | 9/2014 | Yang et al. | |
| 2015/0261556 A1* | 9/2015 | Jain | H04L 49/70 718/1 |
| 2018/0191629 A1 | 7/2018 | Biederman et al. | |
| 2020/0021533 A1 | 1/2020 | Sung et al. | |
| 2020/0120190 A1* | 4/2020 | Cornett | H04L 69/166 |
| 2020/0127926 A1* | 4/2020 | Kim | H04L 47/36 |
| 2020/0204503 A1* | 6/2020 | Cornett | H04L 69/22 |
| 2021/0297360 A1 | 9/2021 | Park et al. | |
| 2021/0392080 A1* | 12/2021 | Shen | H04L 47/22 |

FOREIGN PATENT DOCUMENTS

| | | |
|---|---|---|
| KR | 10-2010-0015790 A | 2/2010 |
| KR | 10-2017-0006597 A | 1/2017 |
| KR | 10-2017-0040953 A | 4/2017 |
| KR | 10-2019-0000468 A | 1/2019 |
| KR | 10-2020-0007420 A | 1/2020 |
| KR | 10-2020-0017127 A | 2/2020 |
| WO | 2003/077501 A1 | 9/2003 |
| WO | 2016/177435 A1 | 11/2016 |

* cited by examiner

| Server (Tx) - Terminal (Rx) | Description | Description | GRO operation level policy | | | | | |
|---|---|---|---|---|---|---|---|---|
| | | | GRO adjustment interval according to number of RX reception packets (unit: number) | | GRO adjustment interval according to RX speed (unit: pps) | | | |
| IP type combination | | | | | | | | |
| IPv4 - IPv4 or IPv6 - IPv6 | Classification size | | 3 | 200 | 512 | 1024 | 2048 | |
| | Number of aggregations | | No gro | 48 | 2 | 4 | 24 | Maximum |
| IPv4 - IPv6 or IPv6 - IPv4 | Classification size | | 200 | 7200 | 1024 | 4096 | 8192 | |
| | Number of aggregations | | No gro | 4 | 2 | 4 | 24 | Maximum |

FIG. 7A

| Server (Tx) - Terminal (Rx) | Description | GRO operation level policy | | | | | |
|---|---|---|---|---|---|---|---|
| IP type combination | Description | GRO adjustment interval according to number of RX reception packets (unit: number) | | GRO adjustment interval according to RX speed (unit: pps) | | | |
| IPv4 - IPv4 or IPv6 - IPv6 | Classification size | 3 | 200 | 512 | 1024 | 2048 | |
| | Number of aggregations | No gro | 3 | 2 | 4 | 8 | 24 |
| IPv4 - IPv6 or IPv6 - IPv4 | Classification size | 200 | 7200 | 1024 | 4096 | 8192 | |
| | Number of aggregations | No gro | 4 | 2 | 4 | 12 | 24 |

FIG. 7B

| Server (Tx) - Terminal (Rx) | Description | GRO operation level policy | |
|---|---|---|---|
| | | Description | |
| | | GRO adjustment interval according to number of RX reception packets (unit: number) | GRO adjustment interval according to RX speed (unit: pps) |
| IP type combination | Classification size | 3 | 200 | 5096 |
| - | Number of aggregations | No gro | 2 | 3 | Maximum |

FIG. 7C

ELECTRONIC DEVICE AND METHOD FOR ELECTRONIC DEVICE PROCESSING RECEIVED DATA PACKET

CROSS-REFERENCE TO RELATED APPLICATION(S)

This application is a continuation application, claiming priority under § 365(c), of an International application No. PCT/KR2021/005800, filed on May 10, 2021, which is based on and claims the benefit of a Korean patent application number 10-2020-0055901, filed on May 11, 2020, in the Korean Intellectual Property Office, the disclosure of which is incorporated by reference herein in its entirety.

BACKGROUND

1. Field

The disclosure relates to an electronic device and a method for processing a received data packet in the electronic device. More particularly, the disclosure relates to an electronic device capable of differently applying a policy related to packet aggregation by considering an application type of a session corresponding to a received data packet, and a method for processing a received data packet in the electronic device.

2. Description of Related Art

With the recent development of mobile communication technology, the use of portable terminals having various functions has become common, and the $5^{th}$ generation (5G) communication system is being serviced to meet the increasing demand for wireless data traffic. In order to achieve a high data transmission rate, the 5G communication system is considered to be implemented in a higher frequency band (e.g., 6 to 60 GHz band) in addition to the frequency band used in a $3^{rd}$ generation (3G) communication system and a long-term evolution (LTE) communication system in order to provide a faster data transmission rate.

An electronic device of a 5G communication method may manage various types of protocol data unit (PDU) sessions, such as an IP multimedia subsystem (IMS) protocol data unit (PDU) session, an enhanced mobile broadband (eMBB) PDU session, an ultra-reliable and low latency communication (URLLC) PDU session, a massive machine-type communications (mMTC) PDU session, and a local area data network (LADN) PDU session, according to the characteristics of a service or an application. For example, the eMBB is a method that can be used in a service or application that requires a high transmission rate (throughput), and the URLLC PDU session may be used in a service or application that requires low-latency.

The above information is presented as background information only to assist with an understanding of the disclosure. No determination has been made, and no assertion is made, as to whether any of the above might be applicable as prior art with regard to the disclosure.

SUMMARY

In order to transmit data through a wired/wireless communication network, a session is established between a server and an electronic device. At the initial stage of transmission in which the session is established and data packets are transmitted/received therethrough, transmission of a response to received data packets in the electronic device may fail due to a time used for aggregating the received data packets, resulting in deceleration of transmission speed. Further, for example, in case that the electronic device has a small amount of received data at the initial stage of the transmission, the transmission speed of data packets to be received may be lowered according to the size of the configured packet aggregation.

For example, in a 5G communication network, in a good channel condition, a large amount of data may be transmitted within a very short period of time. In this case, a packet aggregation policy capable of improving the initial transmission speed for a large amount of data is required to be established to be suitable for the characteristics of the 5G communication network.

Aspects of the disclosure are to address at least the above-mentioned problems and/or disadvantages and to provide at least the advantages described below. Accordingly, an aspect of the disclosure is to provide an electronic device capable of differently applying a policy for a packet aggregation operation level (a generic receiver offload (GRO) level) or a policy related to packet aggregation (hereinafter, "packet aggregation policy" for convenience of explanation) by considering characteristics of a session corresponding to a received data packet, and a method for processing a received data packet in the electronic device.

Another aspect of the disclosure is to provide an electronic device capable of differently applying a policy related to packet aggregation by considering an Internet protocol (IP) type of a session corresponding to a received data packet, and a method for processing a received data packet in the electronic device.

Another aspect of the disclosure is to provide an electronic device capable of differently applying a policy related to packet aggregation by considering an application type of a session corresponding to a received data packet, and a method for processing a received data packet in the electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a network connection device, at least one processor, and a memory operatively connected to the at least one processor, wherein the memory store instructions which are configured to, when executed, cause the electronic device to receive a data packet from a server through the network connection device, identify an Internet protocol (IP) type of the server based on header information of the received data packet, identify information related to packet aggregation configured in response to the identified IP type of the server and an IP type of the electronic device, and aggregate data packets received from the network connection device or flush the data packets to a network stack based on the identified information related to the packet aggregation.

In accordance with another aspect of the disclosure, a method for processing a received data packet in an electronic device is provided. The method includes receiving a data packet from a network connection device, identifying an Internet protocol (IP) type of a server based on header information of the received data packet, identifying information related to packet aggregation configured in response to the identified IP type of the server and an IP type of the electronic device, and aggregating data packets received from the network connection device or flushing the data packets to a network stack based on the identified information related to the packet aggregation.

In accordance with another aspect of the disclosure, an electronic device is provided. The electronic device includes a network connection device, at least one processor, and a memory operatively connected to the at least one processor, wherein the memory store instructions which are configured to, when executed, cause the electronic device to receive a data packet from a server through the network connection device, identify an application type of a session corresponding to the received data packet based on header information of the received data packet, identify information related to packet aggregation configured in response to the identified application type, and aggregate data packets received from the network connection device or flush the data packets to a network stack based on the identified information related to the packet aggregation.

In accordance with another aspect of the disclosure, a method for processing a received data packet in an electronic device is provided. The method includes receiving a data packet from a network connection device, identifying an application type of a session corresponding to the received data packet based on header information of the received data packet, identifying information related to packet aggregation configured in response to the identified application type, and aggregating data packets received from the network connection device or flushing the data packets to a network stack based on the identified information related to the packet aggregation.

According to various embodiments of the disclosure, the processor may include a packet control module configured to receive a data packet from a server through a network connection device, a controller configured to identify an Internet protocol (IP) type of the server based on header information of the received data packet, to identify information related to packet aggregation configured in response to the identified IP type of the server and an IP type of the electronic device, and to generate a control signal causing aggregation of data packets received from the network connection device or flushing of the data packets to a network stack based on the identified information related to the packet aggregation and transmit the control signal to the packet control module, and a packet aggregation module configured to aggregate data packets received through the packet control module in session units and store the aggregated data packets in a buffer, and based on the control of the packet control module having received the control signal, to perform flush processing of the data packet stored in the buffer to the network stack.

According to various embodiments of the disclosure, the processor may include a packet control module configured to receive a data packet from a server through a network connection device, a controller configured to identify an application type of a session corresponding to the received data packet based on header information of the received data packet, to identify information related to packet aggregation configured in response to the identified application type, and to generate a control signal causing aggregation of data packets received from the network connection device or flushing of the data packets to a network stack based on the identified information related to the packet aggregation and transmit the control signal to the packet control module, and a packet aggregation module configured to aggregate data packets received through the packet control module in session units and store the aggregated data packets in a buffer, and based on the control of the packet control module that has received the control signal, to perform flush processing of the data packet stored in the buffer to the network stack.

According to an electronic device and a method for processing a received data packet in the electronic device, by differently applying a policy related to packet aggregation based on the characteristics of a session corresponding to a data packet received from a server during application of a packet aggregation function to the received data packet, an initial throughput of data packet transmission can be increased.

Various embodiments of the disclosure can provide an electronic device capable of differently applying a policy related to packet aggregation by considering an IP type or application type of a session corresponding to a data packet received from a server during application of a packet aggregation function to the received data packet, and a method for processing the received data packet in the electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 7A, 7B, and 7C illustrate an application of a packet aggregation policy according to an IP type according to various embodiments of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
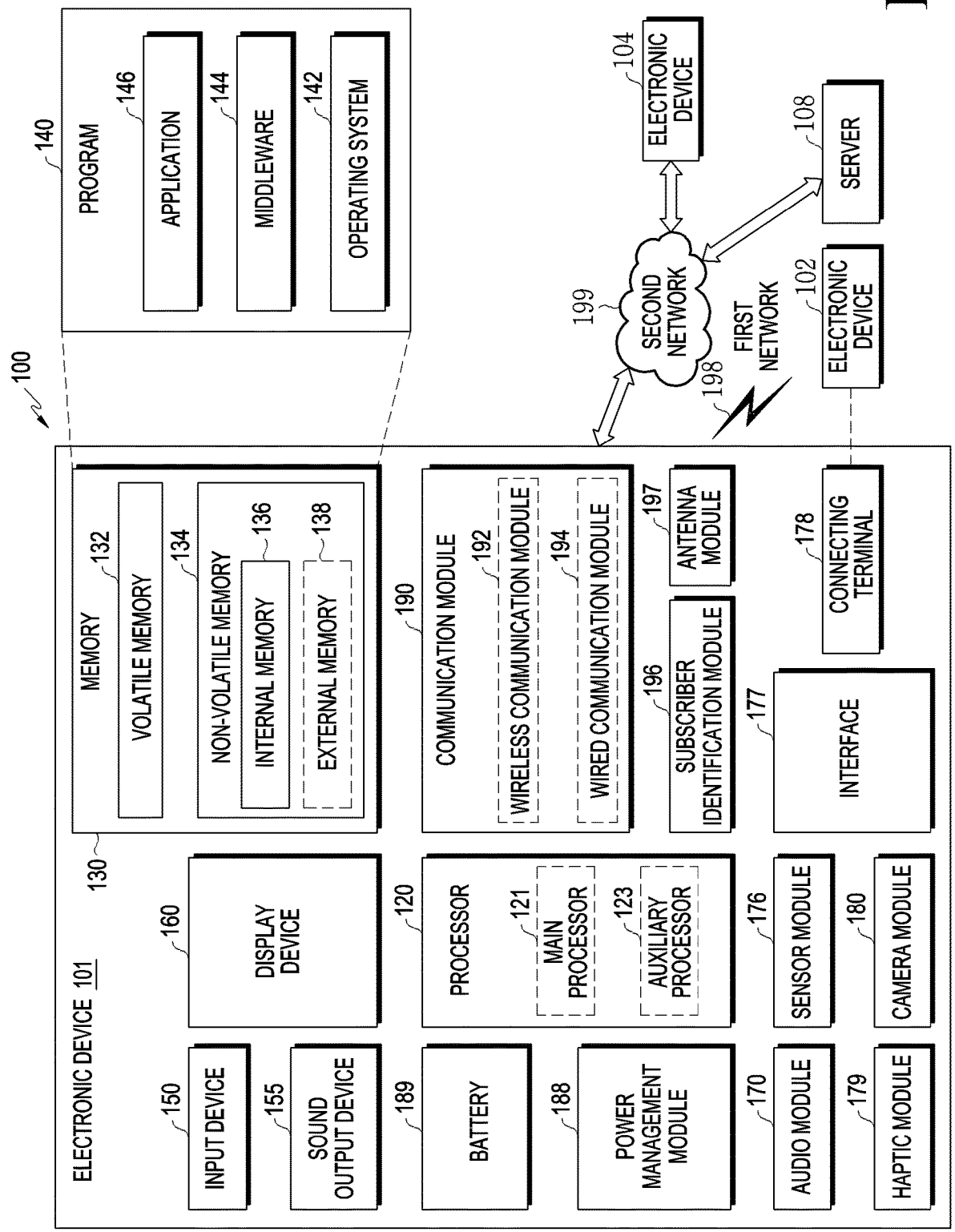
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 or an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or an external electronic device (e.g., the external electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 388 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
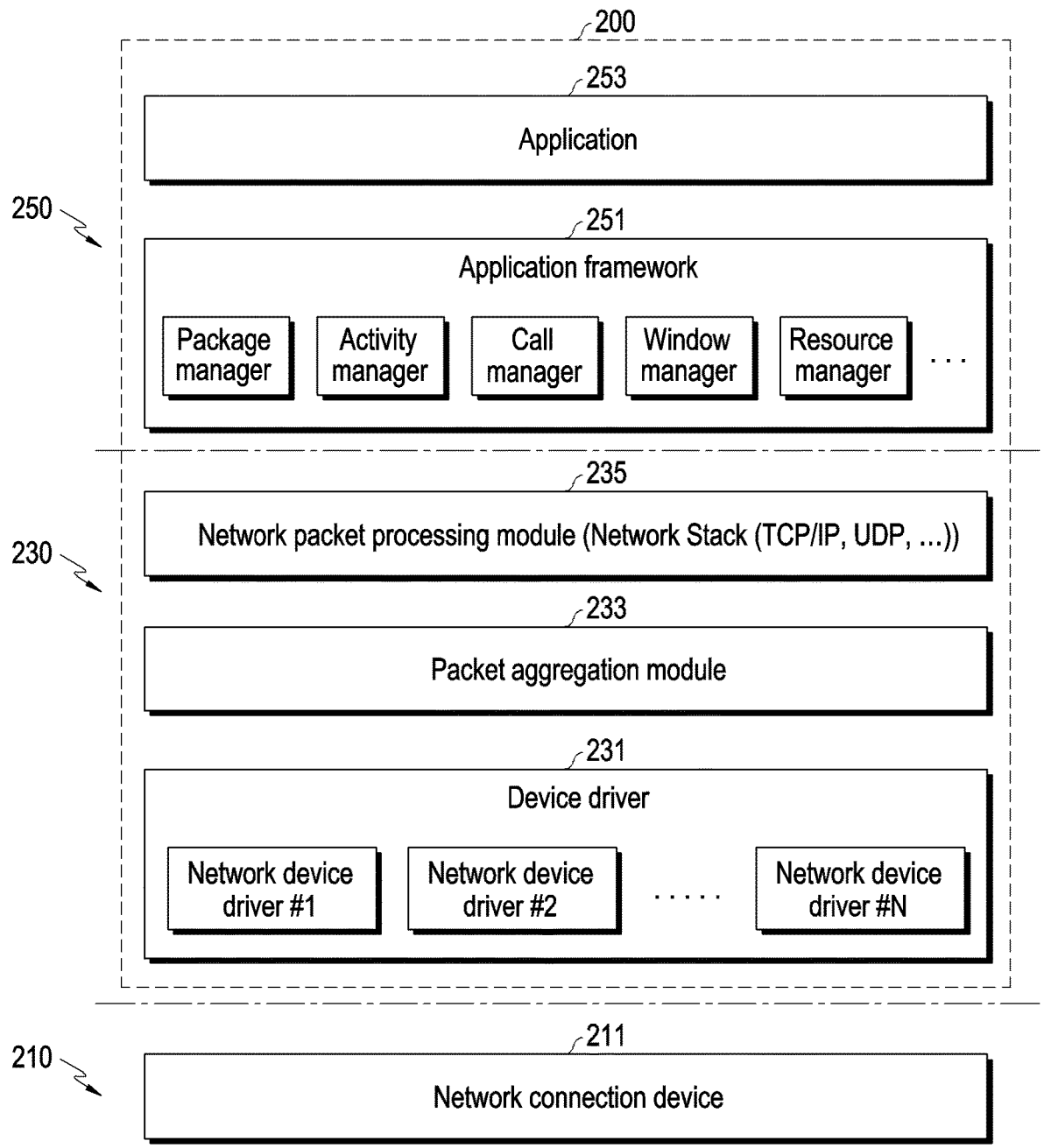
FIG. 2 illustrates a hierarchical configuration for processing of a data packet according to an embodiment of the disclosure.

FIG. 2 illustrates a hierarchical configuration for data packet processing according to an embodiment of the disclosure.

Referring to FIG. 2, an electronic device (e.g., the electronic device 101 of FIG. 1) according to various embodiments may include a device layer 210, a kernel layer 230, and a user layer 250, which are used for transmission or reception of a data packet (hereinafter, referred to as a 'packet' for convenience of explanation). Operations in the device layer 210 may be executed by a communication processor (CP) (e.g., the auxiliary processor 123 of FIG. 1) or a communication module (e.g., the communication module 190 of FIG. 1). The kernel layer 230 and the user layer 250 may correspond to a memory address space included in at least a part of the program 140. Operations in the kernel layer 230 and the user layer 250 may be executed by a processor (e.g., the processor 120 of FIG. 1). The processor 120 may perform operations (or functions) in the kernel layer 230 and the user layer 250 through execution of software 200 (e.g., the program 140 of FIG. 1). Instructions related to the above operations may be stored in a memory (e.g., the memory 130 of FIG. 1).

According to various embodiments of the disclosure, the device layer 210 may provide an operation of a hardware device for transmitting or receiving a packet. The device layer 210 may include a network connection device 211 (e.g., a network interface controller (NIC) or a modem). The network connection device 211 may be a hardware device configured to convert a packet to be transferred through a network by the electronic device 101 into a signal or a bit stream and physically transmit or receive the converted signal or bit stream. The packet may include a data packet to be transferred to a reception terminal (or a receiving electronic device) by a transmission terminal (or a transmitting electronic device).

According to various embodiments of the disclosure, the application processor (AP) (e.g., the processor of FIG. 1) 120) may receive a packet through the network connection device 211 (e.g., the communication module 190 of FIG. 1), and may transmit the packet through the network connection device 211. For example, the network connection device 211 may include a communication processor (CP) (e.g., the auxiliary processor 123 or communication module 190 of FIG. 1) and an interface between the communication processor 123 and the processor 120. The AP may transmit a packet to an external electronic device (e.g., the external electronic devices 102 and 104 of FIG. 1 or a server (e.g., the server 108 of FIG. 1) through the network connection device 211, and may receive a packet transmitted from the external electronic device or the server. According to various embodiments of the disclosure, the network connection device 211 may include an interface (e.g., a peripheral component interconnect express (PCIe) interface, a USB interface, a shared memory interface, or the like) with a modem (e.g., the communication processor 123) electrically connected to the processor 120. According to various embodiments of the disclosure, the network connection device 211 may be included within the processor 120 (e.g., a main processor 121 or a coprocessor 123).

According to various embodiments of the disclosure, the kernel layer 230 may be included in an operating system (OS) of the electronic device (e.g., the operating system 142 of FIG. 1). The kernel layer 230 may control packet processing. The kernel layer 230 may include various modules to process a received packet. The kernel layer 230 may include a device driver 231, a packet aggregation module 233, and a network packet processing module 235.

According to various embodiments of the disclosure, the device driver 231 may process a received packet to be processed by a higher layer. The device driver 231 may process the packet to match the operating system operating in the electronic device 101. The device driver 231 may include one or at least two network device drivers (network device driver #1, network device driver #2, . . . , and network device driver #N). The network device driver may receive a packet according to a communication protocol defined by the manufacturer of the network connection device 211. The network device driver may include device drivers of a network device (e.g., modem, LAN card, Bluetooth, near field communication (NFC), Wi-Fi, display, audio, and video). The network connection device 211 may generate an interrupt (e.g., a hardware interrupt request (HW IRQ)) to the processor 120 while transmitting packet(s) to the processor 120. The network device driver may receive packets with an interrupt. Each network device driver may process received packets into structures.

According to various embodiments of the disclosure, the structures may be stored in a buffer for network processing. The buffer may store structures in the form of a list for packet aggregation, which will be described later. Hereinafter, the operation of processing and storing the packet into a structure is referred to and described as the packet structuring.

According to various embodiments of the disclosure, the packet aggregation module 233 may perform an operation related to packet aggregation (e.g., aggregation, flushing, or skipping). The packet aggregation module 233 may transfer the received packets to a higher layer (e.g., the network packet processing module 235). The packet aggregation module 233 may transfer the structured packets, having been received from the device driver 231, to a higher layer. The packet aggregation module 233 may aggregate the received packets and transfer the aggregated packets. An operation related to packet aggregation may imply a technique in which, upon receiving a packet from the network device driver, consecutive pieces of packet data in which at least a part of IP/TCP header information is the same are aggregated (or bundled) into one packet, and the aggregated packet is transferred to the network processing module 235 (e.g., a network stack). The packet aggregation module 233 may reduce the load on the network packet processing module 255 by aggregating the received packets and transferring the aggregated packet to a higher layer at once. In addition, through an operation related to packet aggregation, the number of responses (e.g., acknowledge (ACK)) to a received packet is reduced, and thus the load on the network connection device 211 may be reduced. Alternatively, as the overall load in the system decreases, processing efficiency may increase, which resulting in increasing the throughput (Tput).

According to various embodiments of the disclosure, the packet aggregation module 233 may directly transfer the received packets to a higher layer (e.g., a transmission control protocol (TCP)/Internet protocol (IP)). When a notification indicating that the reception of packets is complete is received or a specific condition is satisfied, the packet aggregation module 233 may directly transfer the received packets to a higher layer.

According to various embodiments of the disclosure, an operation of aggregating the received packets and transferring the aggregated packets to a higher layer or directly transferring received packets to a higher layer in the packet aggregation module 233 may be referred to as a flush. The flush may refer to an operation of transferring structures stored in a buffer of the packet aggregation module 233 to a higher layer. The packet aggregation module 233 may store the structures in a buffer in the form of a list to correspond to a stream (e.g., a TCP stream). The packet aggregation module 233 may include a list of packets corresponding to each stream.

According to various embodiments of the disclosure, an operation related to packet aggregation may be referred to as an offload or a receive offload. An operation related to packet aggregation may be performed as a function defined in an OS operating in the electronic device 101. For example, an operation related to packet aggregation may include a generic receiver offload (GRO) of Linux™. As another example, the operation related to packet aggregation may be receive segment coalescing (RSC) of Windows™.

In various embodiments of the disclosure, when the processor (e.g., the processor 120 of FIG. 1) is a multi-core processor having a plurality of cores (core processors), the operation of the packet aggregation module 233 is performed in a different processor for each session in parallel.

According to various embodiments of the disclosure, the network packet processing module 235 may process a packet received from the packet aggregation module 233. The network packet processing module 235 may include a network stack. The network packet processing module 235 may include a network layer (e.g., Internet protocol (IP) or Internet control message protocol (ICMP)) and a transport layer (transmission control protocol (TCP) or user datagram protocol (UDP)). The network packet processing module 235 may receive a packet from the network connection device 211 through the device driver 231 and the packet aggregation module 233. The network packet processing module 235 may process the packets, having been received from the device driver 231 and the packet aggregation module 233 and then transfer the processed packets to a user layer, so as to enable processing in the user layer. For example, in the IP layer, the network packet processing module 235 may perform IP routing. In addition, for example, in the TCP layer, the network packet processing module 235 may identify a TCP control block. The network packet processing module 235 may identify the IP and port number of the corresponding packet.

According to various embodiments of the disclosure, the user layer 250 may perform operations of using packets transferred from the kernel layer 230. In the user layer 250, the transferred packets may be used to meet the purpose of applications operating in the user layer. For example, a message may be displayed to a user of the electronic device 101 or a video streaming service may be provided thereto. The user layer 250 may include an application framework 251 and an application 253.

According to various embodiments of the disclosure, the application 253 may be run on an operating system (e.g., the operating system 142 of FIG. 1) configured to control resources related to the electronic device and/or an operating system. The operating system may include, for example, Android™, Linux™, jOS™ Windows™, Symbian™, Tizen™, or Bada™. The application framework 251 may provide a function commonly required by the applications 253 or provide various functions allowing the application 253 to use a limited system resource inside the electronic device to the application 253.

According to various embodiments of the disclosure, the packets received from the network connection device 211 may be transferred to the network packet processing module 235 (e.g., a network stack) after passing through the packet aggregation module 233 through the device driver 231, which may be implemented in the form of software 200 (e.g., the program 141 of FIG. 1), and the application 253 may use the packets processed in the network packet processing module 235 (e.g., network stack).

According to various embodiments of the disclosure, an operation related to packet aggregation provided by the packet aggregation module 233 may reduce the processing load in the network stack by aggregating multiple received packets into one packet and transferring the aggregated packet to the network stack at once. A maximum transmission unit (MTU) may be the maximum transmission unit of a packet that can be transferred to a network layer (e.g., an IP layer of a network stack). When an operation related to packet aggregation is not applied, the network device driver transfers a packet having a size less than or equal to the MTU to the network stack. When an operation related to packet aggregation is applied, the size of the packet flushed to the network stack may exceed that of the MTU (e.g., 64 kilobytes or 999). When the operation related to packet aggregation is applied, the load on the network stack of the system is reduced and a small number of acknowledgments (ACKs) for packets is transmitted to the server side, and thus the load on data transmission hardware, such as a NIC or modem and the entire network processor can be reduced. However, when the packet aggregation module 233 uniformly aggregates packets and transfers the aggregated packets to a higher layer, for example, when the network speed is low, such as during initial packet transmission, transmission of an ACK to the received packet is delayed and the network speed may not increase rapidly.

According to various embodiments of the disclosure, a transport protocol, such as TCP may increase the window size each time an ACK is received for congestion control. For example, during the initial transmission, each time an ACK is received, the window size may be increased exponentially until exceeding a threshold value. For example, at the initial transmission, the faster the ACK is transmitted to the transmitted packet, the faster the increase in the network speed. However, when a small number of ACKs is transmitted, the increase in the network speed becomes slow, which may result a time delay for starting the first screen during playback of a streaming video. For example, when an ACK is transmitted once for a plurality of aggregated packets instead of transmitting an ACK for each received packet, a transmitting terminal may increase the window size by considering only one ACK. When an operation related to packet aggregation is applied, the number of ACK occurrences is reduced, and thus the throughput can be reduced compared to a case in which the operation related to packet aggregation is not applied. Since the number of ACK occurrences increases as the network conditions improve, a decrease in throughput due to the operation related to packet aggregation may occur.

According to various embodiments of the disclosure, the packets may be adaptively (or variably) aggregated and transferred to a higher layer based on a session characteristic (e.g., IP type or application type) corresponding to the received data packet, or the received packet may be transmitted directly to a higher layer so as to improve the throughput. Hereinafter, in this document, an operation of transferring packets (e.g., aggregated packets) from the packet aggregation module 233 to a higher layer (e.g., the network packet processing module 235) may be referred to as a flush.

Figure 3:
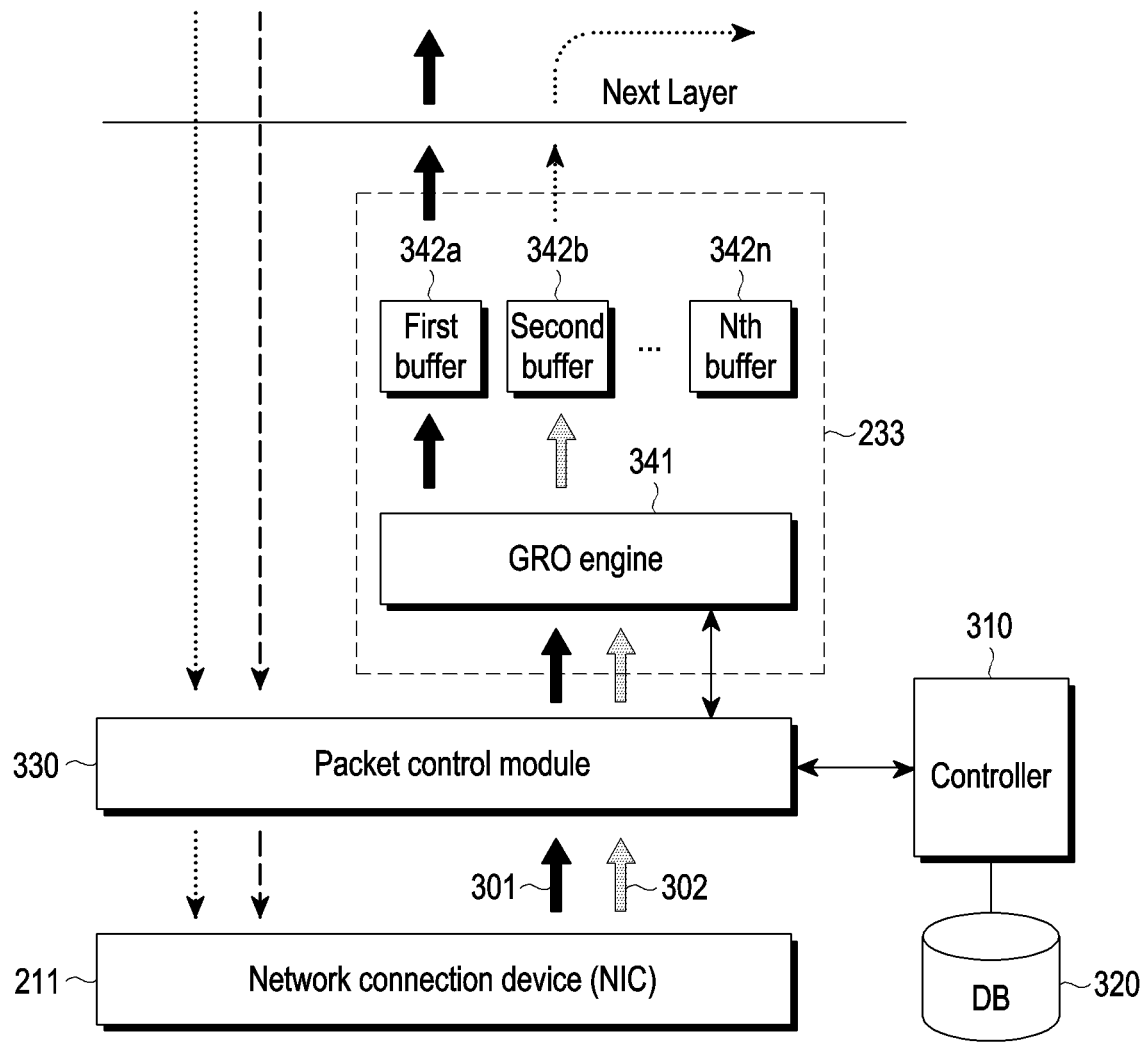
FIG. 3 illustrates a data packet processing in an electronic device according to an embodiment of the disclosure.
Figure 4:
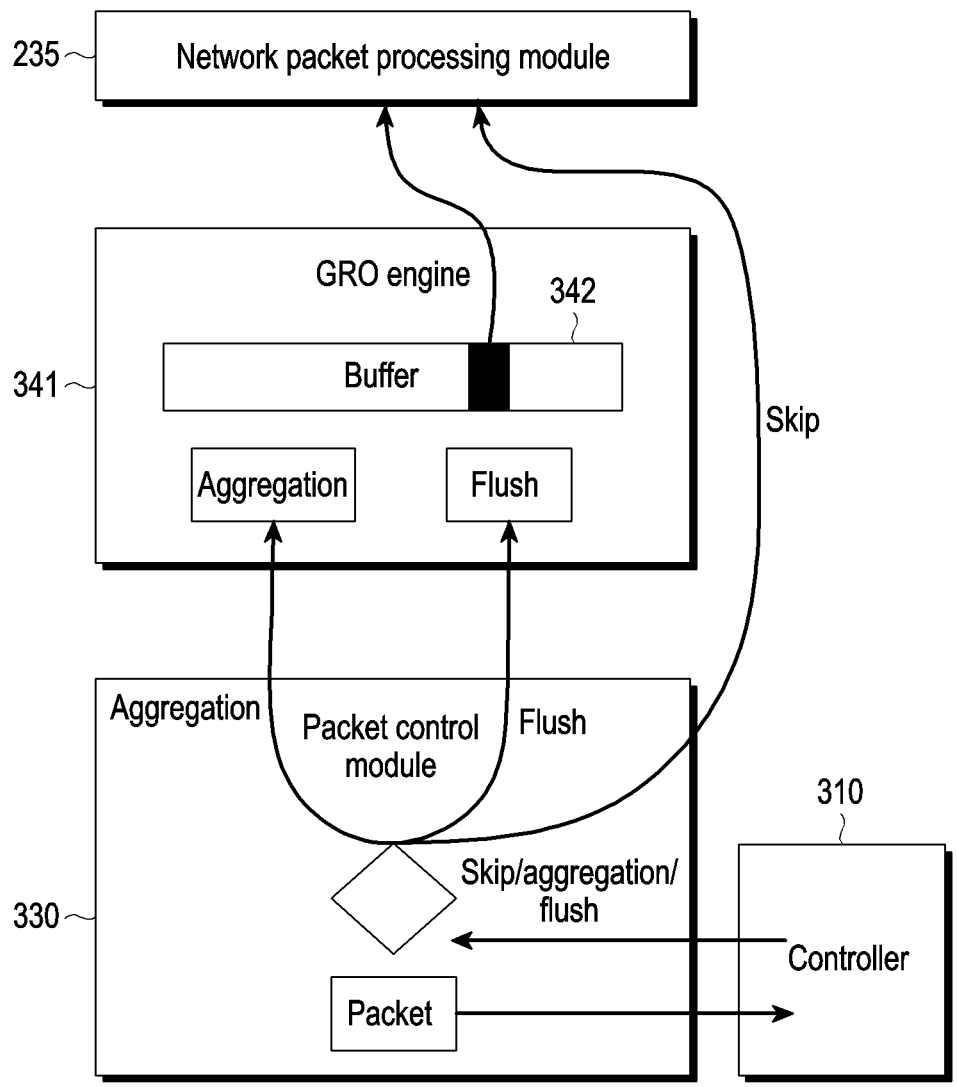
FIG. 4 illustrates a data packet processing in an electronic device according to an embodiment of the disclosure.

FIGS. 3 and 4 illustrate packet processing in an electronic device according to various embodiments of the disclosure.

Referring to FIGS. 3 and 4, according to various embodiments of the disclosure, the electronic device may include a network connection device 211, a controller 310, a packet control module 330, a packet aggregation module 233, and a database 320. The packet control module 330 and/or the controller 310 may be executed in the form of software in the processor 120. Referring to FIGS. 3 and 4, according to various embodiments of the disclosure, a packet received from the server may be received by the packet control module 330 through the network connection device 211. The packet control module 330 may be configured to perform an operation related to packet aggregation (e.g., aggregation, flushing, or skipping) based on a packet aggregation policy (hereinafter referred to as a 'packet aggregation policy' for convenience of explanation) configured for each packet received through the network connection device 211.

According to various embodiments of the disclosure, in the following description, meta data of a packet may include header information of a packet, a session ID stored in the packet, and a data length of the packet. The header information of the packet may include a source IP address of the packet, a destination IP address of the packet, and a port, and is not limited thereto.

According to various embodiments of the disclosure, in the description to be described later, session meta data may include a packet per second (PPS) of a session, a source IP address of the session, a destination IP address of the session, and application information (e.g., an application ID and an application type), but is not limited thereto.

According to various embodiments of the disclosure, in the description to be described below, session characteristic information (or session-specific characteristic information) may include a source IP type of the session, a destination IP type of the session, latency, packet per second (PPS), and the number of received packets, and is not limited thereto.

According to various embodiments of the disclosure, the packet control module 330 may transmit a received packet (e.g., an IP packet) or meta data of the received packet to the controller 310. The meta data may be included in a header area of the corresponding packet. The meta data may include session information of a corresponding data packet. The controller 310 may be configured to receive meta data of the corresponding packet from the packet control module 330 and identify session information (e.g., TCP/IP session information) from the received meta data. The controller 310 may be configured to identify policy information related to packet aggregation for a corresponding session stored in a database (DB) 320 based on the identified session information.

According to various embodiments of the disclosure, the database 320 may store session characteristic information for each session currently configured in the electronic device 101. The session characteristic information may include at least one of an IP or IP type of a server having transmitted the packet, an IP or IP type of the electronic device 101 having received the packet, whether the session is a session requiring conversion of the IP type (e.g., whether the session is related to customer side translator (CLAT) processing), the type of a reception interface corresponding to the session, an IP that has established the session, an application that has established the session, the type of protocol for transmission and reception of the data packet, or a processing interval of a protocol for transmission and reception of the data packet.

According to various embodiments of the disclosure, the controller 310 may configure policy information related to packet aggregation for each session according to the characteristic information of each session and store the configured policy information in the database 320. The packet aggregation-related policy information is information configure based on characteristic information of the session, and may include information on the number of packets to be aggregated according to the number of received packets or a packet reception speed.

For example, when the session characteristic information includes information related to the IP types of the server and the electronic device, the packet aggregation related policy information may be configured as shown in FIG. 7A.

FIGS. 7A, 7B, and 7C illustrate an application of a packet aggregation policy according to an IP type according to various embodiments of the disclosure.

Referring to FIG. 7A, when the session characteristic information includes information related to the IP types of the server and the electronic device, the packet aggregation operation level (or generic receive offload (GRO) level) policy when the IP types of the server and the IP type of the electronic device are the same and the packet aggregation operation level policy when the IP types of the server and the IP type of the electronic device are different may be configured differently according to various embodiments. According to various embodiments of the disclosure, the IP type may be identified through the form of each IP, and is not limited thereto. For example, when the IP type is IPv4, the length of the IP address may be 32 bits, and when the IP type is IPv6, the length of the IP address may be 128 bits.

For example, when the IP type of the server and the IP type of the electronic device are the same (e.g., when the IP type of the server is IPv4 and the IP type of the electronic device is IPv4, or when the IP type of the server is IPv6 and the IP type of the electronic device is IPv6), the number of packets to be aggregated in the packet aggregation module 233 may be configured to increase relatively faster as shown in FIG. 7A. For example, referring to FIG. 7A, after a corresponding session is established, the first received packet to the third packet may be configured not to be aggregated (No generic receive offload (GRO)), and a packet received thereafter to the 200th received packet may be configured to be aggregated in units of 48. Thereafter, starting from a packet received after the 200th packet, the number of packets to be aggregated may be differentially configured according to the number of packets processed per second (hereinafter, referred to as packet per second (PPS)) of the current session. For example, control may be performed such that when the PPS of the current session is 512 or less, packets are aggregated in units of 2 and then flushed, when the PPS of the current session is 512 to 1024, packets are aggregated in units of 4 and then flushed, when the PPS of the current session is 1024 to 2048, packets are aggregated in units of 24 and then flushed, and when the PPS of the current session exceeds 2048, packets are aggregated in units of a designated maximum value (e.g., 64 KB or 999) and then flushed.

According to various embodiments of the disclosure, when the IP type of the server and the IP type of the electronic device are different (e.g., when the IP type of the server is IPv4 and the IP type of the electronic device is IPv6, or the IP type of the server is IPv6 and the IP type of the electronic device is IPv4), the number of packets to be aggregated in the packet aggregation module 233 may be configured to increase relatively slower as shown in FIG. 7A. For example, referring to FIG. 7A, after a corresponding session is established, the first received packet to the 200th packet may be configured not to be aggregated (No generic receive offload (GRO)), and a packet received thereafter to the 7200th received packet may be configured to be aggregated in units of 4. Thereafter, starting from a packet received after the 7200th packet, the number of packets to be aggregated may be differentially configured according to the number of packets processed per second (hereinafter, referred to as packet per second (PPS)) of the current session. For example, control may be performed such that when the PPS of the current session is 1024 or less, packets are aggregated in units of 2 and then flushed, when the PPS of the current session is 1024 to 4096, packets are aggregated in units of 4 and then flushed, when the PPS of the current session is 4096 to 8192, packets are aggregated in units of 24 and then flushed, and when the PPS of the current session exceeds 8192, packets are aggregated in units of a designated maximum value (e.g., 64 KB or 999) and then flushed.

As such, the controller 310 may configure different policies related to packet aggregation according to the characteristics of each session (e.g., whether IPs of the server and the electronic device are different in FIG. 7A).

According to various embodiments of the disclosure, the controller 310 may configure different policies related to packet aggregation according to an application among characteristics of each session. For example, each application may have a different size of received data and a different need for low latency depending on the type. The following Table 1 is a table showing the characteristics of received data according to the type of each application.

TABLE 1

| Application type | Characteristics of received data | |
|---|---|---|
| | Size of data | Need for low latency |
| Game | small | high |
| Video streaming | large | low |
| SNS | small (intermittently large) | high |
| File download | large | low |
| Internet browser | small (intermittently large) | high |
| Navigation | small | high |

According to various embodiments of the disclosure, in a case of a session of a specific application, a policy related to packet aggregation may be configured separately or in combination with the above-described IP type of the server or the electronic device. For example, in a case of an application which has a large amount of received data per unit time and a low need for low latency (e.g., video streaming or file download), the reception speed may be improved by rapidly increasing the number of packets to be aggregated in the packet aggregation module 233. In addition, in the case of an application which has a small amount of received data per unit time and a high need for low latency (e.g., game or navigation), the number of packets to be aggregated in the packet aggregation module 233 may be configured to be maintained small for application responsiveness. In addition, in the case of an application (e.g., social networking service (SNS) or Internet browser) in which the received data per unit time is variable and the need for low latency is high, the number of packets to be aggregated in the packet aggregation module 233 is maintained small up to a threshold data size, and the number of packets to be aggregated in the packet aggregation module 233 may be variably adjusted when the data size of the received data is equal to or greater than the threshold data size.

According to various embodiments of the disclosure, the type of the application may be identified by a type of a category designated for each application or may be identified by a package-type map predefined by a system developer, and is not limited thereto. According to various embodiments of the disclosure, the ID of each application may be generated using a network interface and a port to be used during Internet connection for the corresponding application, as key values. According to another embodiment of the disclosure, when one application communicates through a plurality of ports, the application ID may be generated using a UID or a package name, as a key value. In addition, the ID of each session and the network interface and port of the session may be mapped to each other and stored as a table, and meta data of the session may be stored in a database using the ID of each session, as a key value. According to various embodiments of the disclosure, an interface name and port of a corresponding session may be included in the meta data of the session, and a key value generated based on the interface name and port may be mapped to each application ID and then stored. According to various embodiments of the disclosure, the each application ID may be mapped to information on the type of the corresponding application and then stored, and accordingly, information on the type of application as well as the each application ID are mapped to the meta data of each session and then stored.

According to various embodiments of the disclosure, in each application, the aggregation policy shown in FIG. 7A may be configured as a default policy, and the number of packets to be aggregated may be adjusted in compliance with the policy. According to various embodiments of the disclosure, the application corresponding to the game application type among the application types shown in Table 1 may be configured with a separate policy in which a packet aggregation operation level is modified as shown in FIG. 7B, and thus the number of packets to be aggregated may be adjusted.

According to various embodiments of the disclosure, in each application, the aggregation policy shown in FIG. 7A may be configured as a default policy, and the number of packets to be aggregated may be adjusted in compliance with the policy. For example, a specific application (e.g., game) defined by a user or a system may be assigned a separate policy in which a packet aggregation operation level is modified as shown in FIG. 7B, and the number of packets to be aggregated may be adjusted.

According to various embodiments of the disclosure, the aforementioned separate policy as shown in FIG. 7B may include an aggregation policy defined irrespective of the IP type as shown in FIG. 7C.

According to various embodiments of the disclosure, the database 320 may store policy information related to packet aggregation configured according to the characteristics of each session (hereinafter, referred to as 'policy information' for convenience of explanation). In addition, at least one of mapping information between each session and application, mapping information between each application and policy, mapping information between each session and policy, IP/TCP port information related to customer side translator (CLAT) operation, or meta data of each session may be stored in the database 320.

According to various embodiments of the disclosure, the controller 310 may configure a time point for determining the characteristics of a session. For example, the controller 310 may be configured to determine the characteristics of the session at the time of establishment of each session, determine the characteristics of the session at the time of packet reception of each session, and determine the characteristics of the session for configured period.

According to various embodiments of the disclosure, meta data for each session stored in the database 320 may include at least one of a session ID, a session IP, a session port, information (e.g., UID) about an application of the corresponding session, transmission and reception packet period of a session, information on reception speed of a session, information on a protocol of a session, policy information related to packet aggregation of a session, the maximum number of aggregation processing of a session, the number of current aggregated packets in a buffer 342 of the packet aggregation module 233, a timeout time (TIMEOUT) associated with the aggregation processing of a session, or the remaining time until the current timeout comes.

According to various embodiments of the disclosure, the controller 310 may be configured to generate or manage meta data for each session, and to generate or manage a policy related to packet aggregation configured for each session. For example, the controller 310 may be configured to perform configuration or modification to a policy related to packet aggregation mapped to each condition stored in the database 320, according to the time point of generation of meta data for each session, packets received during the initial connection period of each session (e.g., a specific number of packets received after session establishment, or packets received up to a specific period of time), or network characteristics during a configured period (e.g., a network type, a packet protocol, whether operation between a session and a customer side translator (CLAT) occurs, or a time interval between transmission and reception packets). The CLAT may imply conversion of the first type of IP packet (e.g., IPv4 packet) to the second type of IP packet (e.g., IPv6 packet) when the IP types between two devices (e.g., the server and electronic device) are different. According to various embodiments of the disclosure, the IP type of the electronic device described in the disclosure may include the first type of IP packet or the second type of IP packet. For example, in an embodiment of the disclosure, when comparing whether the IP of the server and the IP of the electronic device are of the same type or different types, the IP type of the electronic device may refer to an IP type converted by performing processing of a CLAT on a received data packet. For example, when an IPv6 packet is received from a server through a network and then converted into an IPv4 packet by processing of the CLAT in the electronic device 101, the IP type of the server and the IP type of the electronic device may be considered as a different IP type.

Referring back to FIG. 3, the controller 310 may be configured to identify session information from meta data of the corresponding packet received from the packet control module 330, and to identify policy information related to packet aggregation for the session stored in the database 320 based on the identified session information. According to various embodiments of the disclosure, the controller 310 may be configured to transmit information related to packet aggregation of a packet corresponding to the received meta data to the packet control module 330 based on the identified policy information.

According to various embodiments of the disclosure, the information related to packet aggregation may include at least one of information indicating to aggregate a currently received packet with at least one previously received packet (hereinafter, referred to as 'aggregation (GRO)' for convenience of explanation), information indicating to flush at least one previously received packet stored in a buffer to a network stack (hereinafter, referred to as 'flush' for convenience of explanation), or information indicating to transmit the currently received packet to the network stack instead of aggregating the currently received packet with the previously received packet (hereinafter, referred to as 'skip' for convenience of explanation).

According to various embodiments of the disclosure, the packet control module 330 having received information related to packet aggregation for a corresponding packet from the controller 310 may apply a policy configured for the corresponding packet. Referring to FIGS. 3 and 4, the packet control module 330 may receive information related to packet aggregation from the controller 310 and perform an operation according to the information.

For example, when the packet control module 330 receives 'skip' as the information related to packet aggregation, the packet control module may directly transfer the corresponding packet to the network packet processing module 235 instead of providing the corresponding packet to the GRO engine 341 of the packet aggregation module 233. When the packet control module 330 receives 'aggregation' as the information related to packet aggregation, the packet control module may call a function (e.g., application programming interface (API)) corresponding to the 'aggregation' of the GRO engine 341 and transmit the packet to the GRO engine 341, as a factor according to a result of processing of the called function. The GRO engine 341 may aggregate the corresponding packet received from the packet control module 330 in the buffer 342. During the packet aggregation, the GRO engine 341 may perform aggregation in the same session unit as that of the received packet. According to various embodiments of the disclosure, the packet aggregation module 233 may include a plurality of buffers (e.g., a first buffer 342a, a second buffer 342b, . . . , and an n-th buffer 342n). The GRO engine 341 may aggregate the received packets in a different buffer 342 for each session.

For example, when the packet control module 330 receives 'flush' as the information related to packet aggregation, the packet control module may call a function corresponding to 'flush' of the GRO engine 341. According to the call of the function corresponding to the flush, the GRO engine 341 may transfer the packets aggregated so far in the corresponding buffer to the network packet processing module 235 for flush processing.

According to various embodiments of the disclosure, when the packet control module 330 calls a function corresponding to 'flush' as information related to packet aggregation, and transfers a session ID value of the corresponding packet, as a factor according to the processing result to the called function, to the GRO engine 341, the GRO engine 341 may flush only the packets stored in response to the corresponding session ID value among the packets aggregated in each buffer 342 of the GRO engine 341. According to various embodiments of the disclosure, when the packet control module 330 calls a function corresponding to 'flush' as the information related to packet aggregation, and the called function does not have a specific value in a factor according to the processing result, the packet control module may transfer packets of all sessions aggregated in the buffer 342 of the GRO engine 341 to the network packet processing module 235.

According to various embodiments of the disclosure, the packet control module 330 may receive multiple pieces of information related to packet aggregation from the controller 310, in relation to one packet. For example, the packet control module 330 may receive a combination of 'flush-→skip' from the controller 310, in relation to one packet. The packet control module 330 may be configured to perform control to flush the packets aggregated in the buffer 342 of the GRO engine 341, as packets corresponding to the session ID value for the corresponding packet, and transfer the packet to the network packet processing module 235. As another example, the packet control module 330 may receive a combination of 'aggregation→flush' from the controller 310, in relation to one packet. The packet control module 330 may be configured to perform control the corresponding packet to be aggregated in the buffer 342 of the GRO engine 341, and control the aggregated packets to be flushed.

Figure 5:
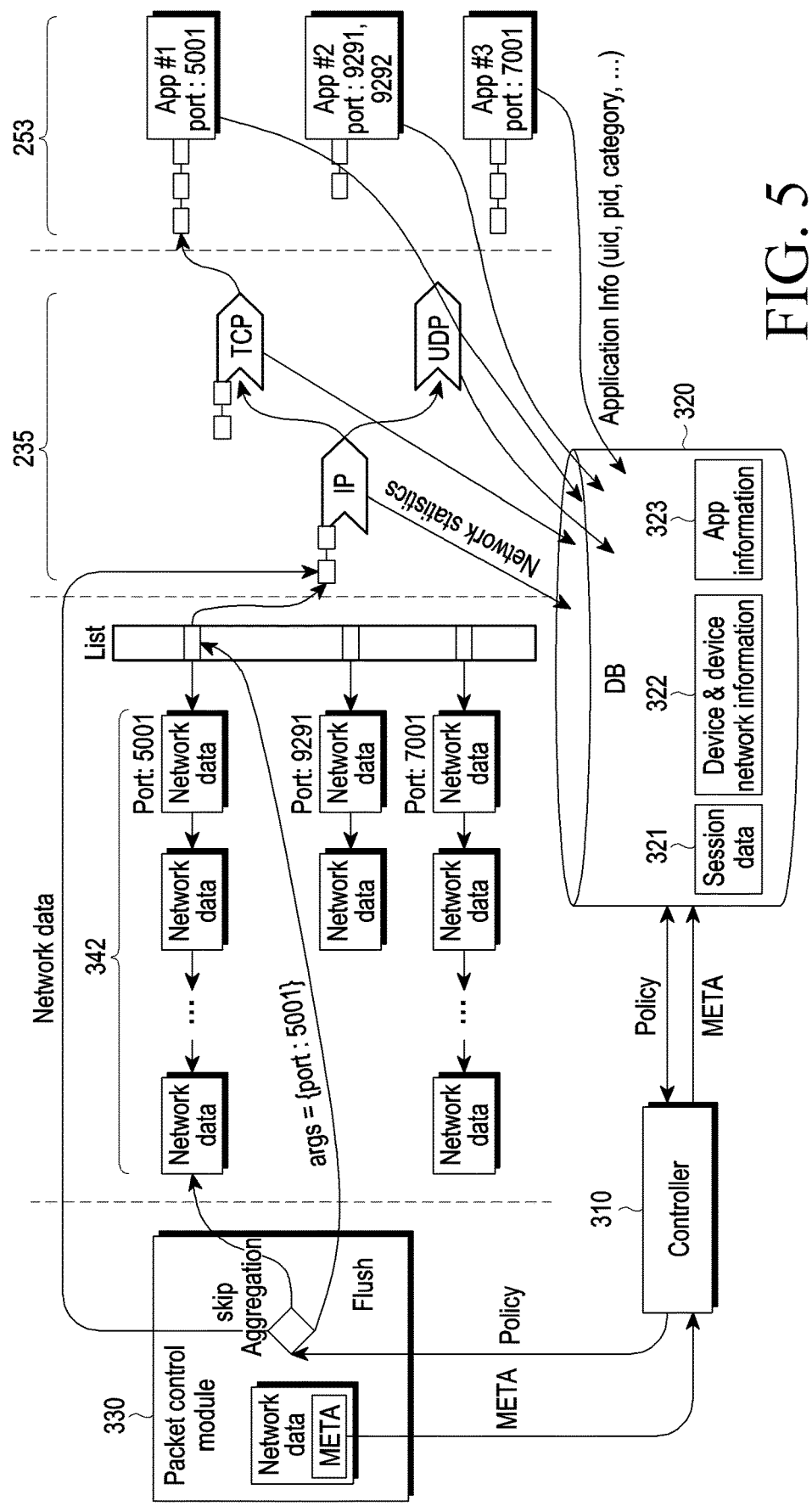
FIG. 5 illustrates a data packet processing in an electronic device according to an embodiment of the disclosure.

FIG. 5 illustrates packet processing according to an embodiment of the disclosure.

Referring to FIG. 5, a network connection device (e.g., the network connection device 211 of FIG. 2) may receive network data received from a transmitting terminal (e.g., a server) and then provide the received network data to a processor (e.g., the processor 120 of FIG. 1). Referring to FIG. 5, operations/functions of processing a packet of the processor 120 for controlling an operation related to packet aggregation according to a policy related to packet aggregation are described. The packet processing may be executed by the processor 120 (e.g., AP or CP) of the electronic device 101, and may be stored in the memory 130 of the electronic device 101 in the form of software 200.

According to various embodiments of the disclosure, the electronic device 101 may receive network data (e.g., a data packet) from the network connection device 211 by using the device driver 231. Although not shown in FIG. 5, the electronic device 101 may store the received network data as a structure by using a network device driver. The electronic device 101 may generate a buffer used for network processing inside the kernel, and store and manage structures in the buffer.

According to various embodiments of the disclosure, the electronic device 101 may generate a list of pieces of network data, and manage the list in the buffer 342 by using the packet aggregation module 233. The electronic device 101 may manage pieces of network data having the same destination as one list by identifying address information (e.g., a port or an IP address) included in the pieces of network data in the packet aggregation module 233. The electronic device 101 may include packet lists for storing pieces of network data in the packet aggregation module 233. The packet lists may include a first packet list, a second packet list, and a third packet list.

For example, pieces of network data corresponding to port 5001 may be connected (or added) to the first packet list. Pieces of network data corresponding to port 9291 may be connected to the second packet list. Pieces of network data corresponding to port 7001 may be connected to the third packet list. When the flush condition is satisfied, the electronic device 101 may perform 'flush' so as to transfer pieces of network data connected to each packet list to a higher layer, for example, the network packet processing module 235 (e.g., a network stack).

According to various embodiments of the disclosure, the electronic device 101 may process pieces of data transmitted from a lower layer, in the network packet processing module 235. For example, the electronic device 101 may process a header of an IP layer and perform IP routing. In addition, for example, the electronic device 101 may process a header of a TCP layer and identify a TCP control block.

According to various embodiments of the disclosure, in the network packet processing module 235, the electronic device 101 may perform processing in each layer (e.g., a network layer or a transport layer), and then transmit the processed packets to a higher layer (e.g., the application layer 253).

According to various embodiments of the disclosure, based on the processing result of the network packet processing module 235, the electronic device 101 may acquire network statistics information and store the acquired network statistics information in the database 320. The electronic device 101 may acquire information about at least one of session data 321, device and device network information 322, and app information 323 and store the acquired information in the database 320. According to various embodiments of the disclosure, the device and device network information 322 may include information on the electronic device 101 and network usage-related statistics information corresponding to the information on the electronic device. The app information 323 may include user ID (UID), process ID (PID), and category information.

According to various embodiments of the disclosure, the application 253 may include App #1, App #2, and App #3, the App #1 may correspond to port 5001, the App #2 may correspond to ports 9291 and 9292, the App #3 may correspond to port 7001. Each application 253 may include at least one of a game, video streaming, SNS, file download, Internet browser, and navigation. Each application 235 may correspond to a destination port. For example, the first packet list may correspond to App #1, the second packet list may correspond to App #2, and the third packet list may correspond to App #3, respectively.

According to various embodiments of the disclosure, the packet control module 330 of the electronic device 101 may transmit meta data relating to the received packet to the controller 310. The controller 310 may be configured to identify session information from the meta data received from the packet control module 330. According to various embodiments of the disclosure, the controller 310 may be configured to identify policy information related to packet aggregation corresponding to the identified session through the database 320 based on the meta data or session information. The controller 310 may be configured to transmit the identified packet aggregation-related policy information (e.g., aggregation, flush, or skip) to the packet control module 330. The packet control module 330 may receive policy information related to packet aggregation for the corresponding packet from the controller 310, and may perform an operation corresponding to aggregation, flush, or skip as described above according to the received policy information.

According to various embodiments of the disclosure, the controller 310 may be configured to apply packet aggregation-related policy information to the received packet differently for each session. Accordingly, the packet control module 330 may differently process an operation related to packet aggregation for each session, in relation to the received packet.

Figure 6:
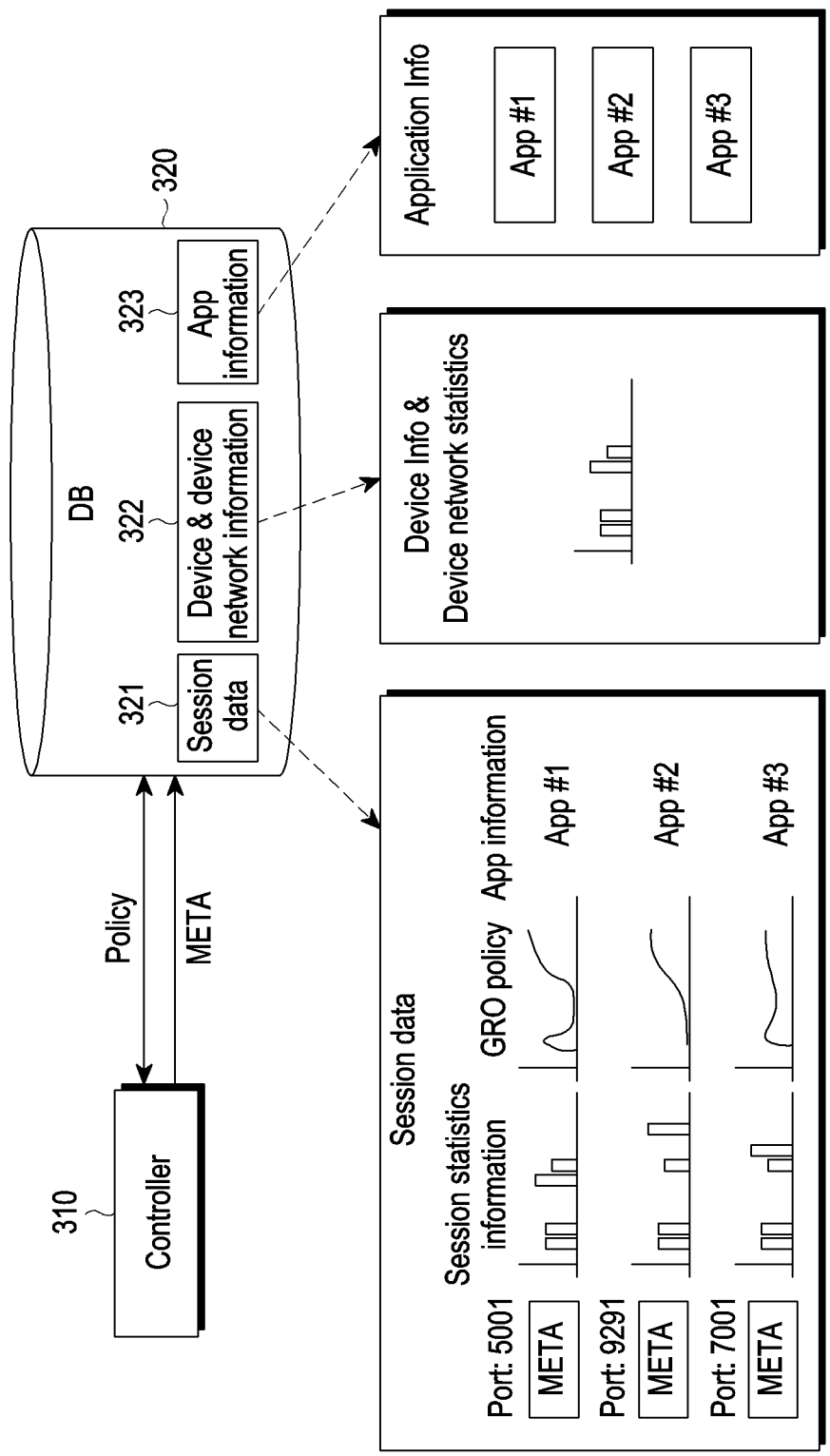
FIG. 6 illustrates information stored in a database in an electronic device according to an embodiment of the disclosure.

FIG. 6 illustrates information stored in a database in an electronic device according to an embodiment of the disclosure.

Referring to FIG. 6, the database 320 may store network statistics information about at least one of session data 321, device and device network information 322, and app information 323.

According to various embodiments of the disclosure, the session data 321 may include at least one of port information, session statistics information, policy information related to packet aggregation (e.g., GRO policy information), and application information. Each piece of information stored in the database 320 may be used to configure policy information related to packet aggregation for each session according to various embodiments.

An electronic device according to any one of various embodiments may include a network connection device, at least one processor, and a memory operatively connected to the at least one processor, wherein the memory store instructions which are configure to, when executed, cause the electronic device to perform control to receive a data packet from the network connection device, identify characteristics of a session corresponding to the received data packet based on header information of the received data packet, identify information related to packet aggregation configured in response to the identified characteristics of the session, and aggregate data packets received from the network connection device or flush the data packets to a network stack based on the identified information related to the packet aggregation.

According to various embodiments of the disclosure, the characteristics of the session may include at least one of an IP of a server having transmitted the data packet, a type of IP of the server, an IP of an electronic device having received the data packet, a type of IP of the electronic device, whether the session requires conversion of the IP type, a type of a reception interface corresponding to a session, an IP that has established a session, an application that has established a session, a type of protocol for transmission and reception of the data packet, or a processing interval of a protocol for transmission and reception of the data packet.

According to various embodiments of the disclosure, the electronic device having received the data packet may have a plurality of IPs according to various methods and uses. For example, the plurality of IPs may include an IP assigned to the electronic device by an Internet service provider (ISP), a private or local IP generated for a service or operation inside the electronic device, and an IP obtained by combining a part of the IP allocated for a session requiring IP type conversion by the Internet provider and a private IP internally generated by the electronic device for IP type conversion.

According to various embodiments of the disclosure, the IP of the electronic device, stored as the device and device network information 322 stored in the database 320, may include an IP assigned to the electronic device by an Internet provider (ISP), and an IP obtained by combining a part of the IP allocated for a session requiring IP type conversion by the Internet provider and a private IP internally generated by the electronic device for IP type conversion.

According to various embodiments of the disclosure, a method for determining whether the session is a session requiring IP type conversion may include at least one of comparing the IP of the electronic device having received the data packet among the characteristics of the session with the IP of the electronic device having received the data packet used for IP type conversion among the device and device network information 322 stored in the database 320, and comparing the IP type of the server having transmitted the data packet with the IP type of the electronic device having received the data packet.

According to various embodiments of the disclosure, the information related to packet aggregation may include at least one of information indicating to aggregate a currently received packet with at least one previously received packet, information indicating to flush at least one previously received packet stored in a buffer to the network stack, or information indicating to transmit the currently received packet to the network stack instead of aggregating the currently received packet with the previously received packet.

According to various embodiments of the disclosure, the instructions may be configured to cause the electronic device to determine whether updating of the information related to packet aggregation is required, the information being configured in response to the characteristics of the session, when, as a result of the determination, the updating is determined to be required, identify meta data of a data packet corresponding to a session, and update information related to the packet aggregation based on the identified meta data.

According to various embodiments of the disclosure, the information related to packet aggregation may be configured according to a first packet aggregation policy in case that the IP type of the server to which the data packet is transmitted is the same as the IP type of the electronic device according to the characteristics of the session, and configured according to a second packet aggregation policy in case that the IP type of the server to which the data packet is transmitted is different from the IP type of the electronic device according to the characteristics of the session.

According to various embodiments of the disclosure, the information related to packet aggregation may be configured such that the rate at which the number of data packets to be aggregated increases is faster, with regard to an application that has a relatively large amount of received data per unit time according to the characteristics of the session.

According to various embodiments of the disclosure, the information related to packet aggregation may be configured such that the number of data packets to be aggregated is small, with regard to an application having a relatively high need for low latency according to the characteristics of the session.

An electronic device according to any one of various embodiments may include a network connection device, at least one processor, and a memory operatively connected to the at least one processor, wherein the memory store instructions which are configured to, when executed, cause the electronic device to receive a data packet from a server through the network connection device, identify an Internet protocol (IP) type of the server based on header information of the received data packet, identify information related to packet aggregation configured in response to the identified IP type of the server and an IP type of the electronic device, and aggregate data packets received from the network connection device or flush the data packets to a network stack, based on the identified information related to the packet aggregation.

According to various embodiments of the disclosure, the information related to packet aggregation may be configured according to a first packet aggregation policy in case that the IP type of the server to which the data packet is transmitted is the same as the IP type of the electronic device according to the characteristics of the session, and configured according to a second packet aggregation policy in case that the IP type of the server to which the data packet is transmitted is different from the IP type of the electronic device according to the characteristics of the session.

According to various embodiments of the disclosure, the instructions may be configured to cause the electronic device to identify whether a data packet of a next chunk is received within a preconfigured period of time, and when, as a result of the identification, the data packet of the next chunk is not received within the preconfigured period of time, flush pre-aggregation processed data packets to the network stack.

The processor according to any one of various embodiments may include a packet control module configured to receive a data packet from a server through a network connection device, a controller configured to identify an Internet protocol (IP) type of the server based on header information of the received data packet, to identify information related to packet aggregation configured in response to the identified IP type of the server and an IP type of the electronic device, and to generate a control signal causing aggregation of data packets received from the network connection device or flushing of the data packets to a network stack based on the identified information related to the packet aggregation and transmit the control signal to the packet control module, and a packet aggregation module configured to aggregate data packets received through the packet control module in session units and store the aggregated data packets in a buffer, and based on the control of the packet control module having received the control signal, to perform flush processing of the data packet stored in the buffer to the network stack.

The processor according to any one of various embodiments may include a packet control module configured to receive a data packet from a server through a network connection device, a controller configured to identify an application type of a session corresponding to the received data packet based on header information of the received data packet, to identify information related to packet aggregation configured in response to the identified application type, and to generate a control signal causing aggregation of data packets received from the network connection device or flushing of the data packets to a network stack based on the identified information related to the packet aggregation and transmit the control signal to the packet control module, and a packet aggregation module configured to aggregate data packets received through the packet control module in session units and store the aggregated data packets in a buffer, and based on the control of the packet control module that has received the control signal, to perform flush processing of the data packet stored in the buffer to the network stack.

Hereinafter, operating methods performed in the electronic device 101 of FIGS. 1 to 6 described above according to various embodiments will be described with reference to FIGS. 8 to 11, 12A, 12B, and 13.

Figure 8:
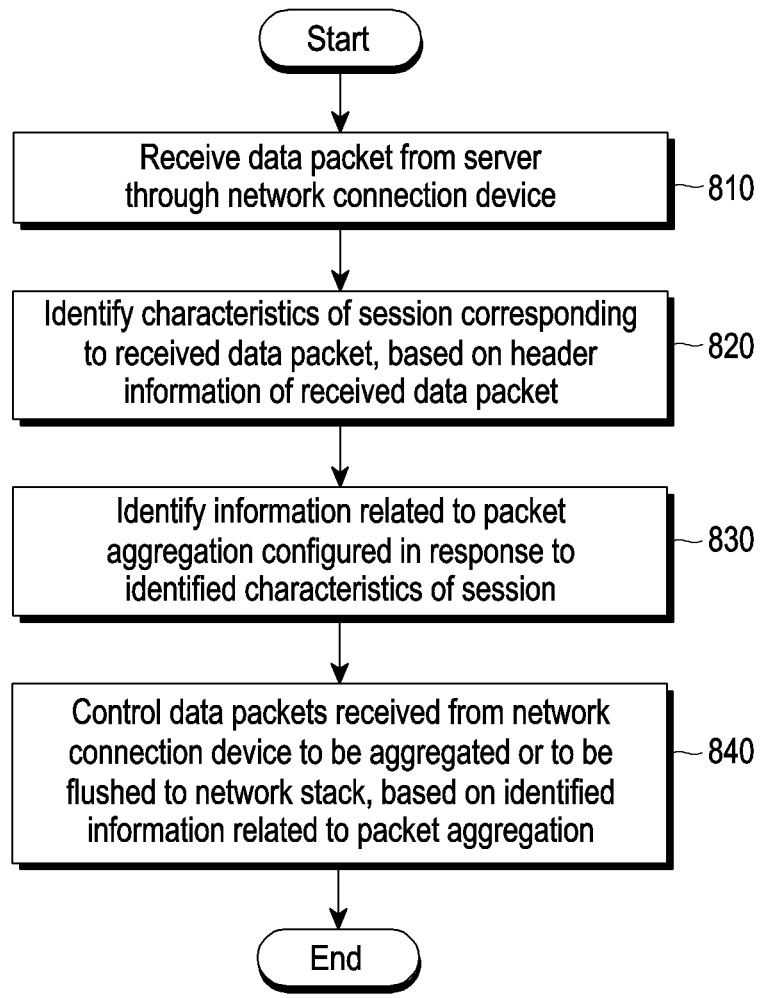
FIG. 8 is a flowchart illustrating an operation of processing a data packet in an electronic device according to an embodiment of the disclosure.

FIG. 8 is a flowchart illustrating an operation for processing a packet in an electronic device according to an embodiment of the disclosure.

Referring to FIG. 8, in operation 810, the electronic device 101 (e.g., the processor 120 of the electronic device 101) may receive a data packet from a server through a network connection device (e.g., the network connection device 211 or modem of FIG. 2).

According to various embodiments of the disclosure, in operation 820, the electronic device may be configured to identify characteristics of a session corresponding to the received data packet based on header information (e.g., meta data) of the received data packet. According to various embodiments of the disclosure, the characteristics of the session may include at least one of an IP or IP type of a server having transmitted the data packet, an IP or IP type of the electronic device 101 having received the data packet, whether the session requires conversion of the IP type, a type of a reception interface corresponding to a session, an IP that has established a session, an application that has established a session, a type of protocol for transmission and reception of the data packet, or a processing interval of a protocol for transmission and reception of the data packet.

According to various embodiment of the disclosure s, in operation 830, the electronic device may be configured to identify information related to packet aggregation configured in response to the identified characteristics of the session. The information related to packet aggregation may include information (e.g., aggregation) indicating to aggregate a currently received packet with at least one previously received packet, information (e.g., flush) indicating to flush the at least one previously received packet stored in a buffer to the network stack, or information (e.g., skip) indicating to transmit a currently received packet to the network stack instead of aggregating the currently received packet with the previously received packet.

According to various embodiments of the disclosure, in operation 840, the electronic device may be configured to perform control to aggregate data packets received from the network connection device or flush the data packets to a network stack based on the identified packet aggregation-related information.

Figure 9:
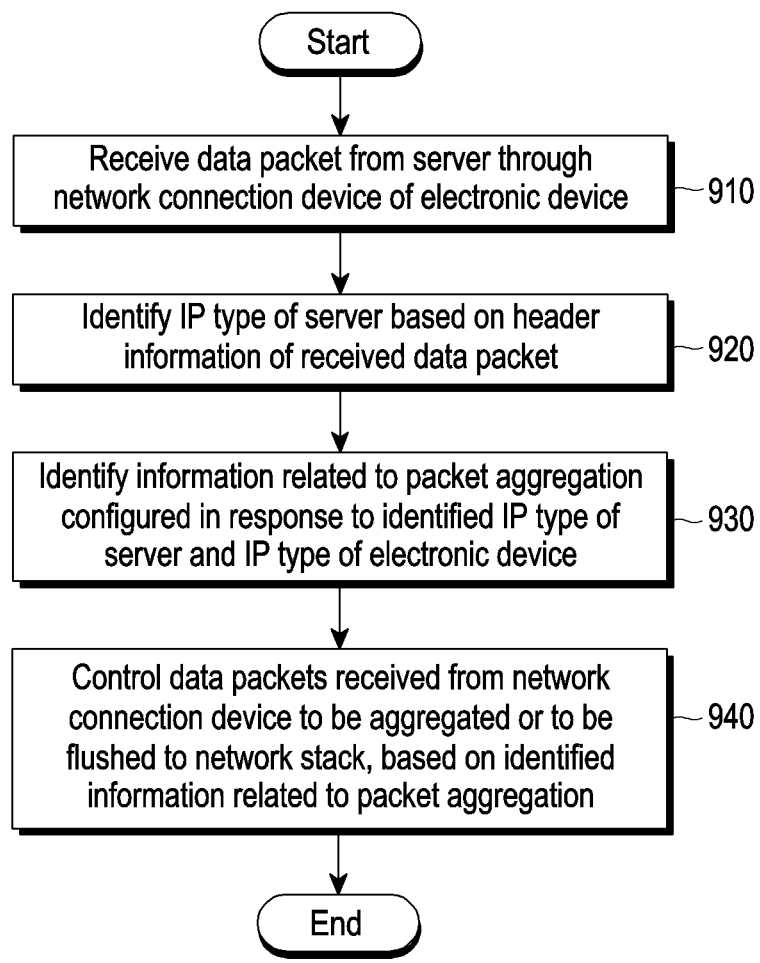
FIG. 9 is a flowchart illustrating an operation of processing a data packet in an electronic device according to an embodiment of the disclosure.

FIG. 9 illustrates a flow of an operation for processing a packet in an electronic device according to an embodiment of the disclosure.

Referring to FIG. 9, the electronic device 101 (e.g., the processor 120 of the electronic device 101) may receive a data packet from a server through a network connection device (e.g., the network connection device 211 of FIG. 2) in operation 910.

According to various embodiments of the disclosure, the electronic device may be configured to determine an Internet protocol (IP) type of a server having transmitted the received data packet, based on header information (e.g., meta data) of the received data packet, in operation 920. According to various embodiments of the disclosure, the electronic device may be configured to identify the IP type of the electronic device by identifying whether CLAT processing is performed on the received data packet.

According to various embodiments of the disclosure, in operation 930, the electronic device may be configured to identify information related to packet aggregation configured in response to the IP type of the server and the IP type of the electronic device. The information related to packet aggregation includes information (e.g., aggregation) indicating to aggregate a currently received packet with at least one previously received packet, information (e.g., flush) indicating to flush the at least one previously received packet stored in a buffer to the network stack, or information (e.g., skip) indicating to transmit a currently received packet to the network stack instead of aggregating the currently received packet with the previously received packet.

According to various embodiments of the disclosure, in operation 940, the electronic device may be configured to perform control to aggregate data packets received from the network connection device or flush the data packets to a network stack based on the identified packet aggregation-related information.

Figure 10:
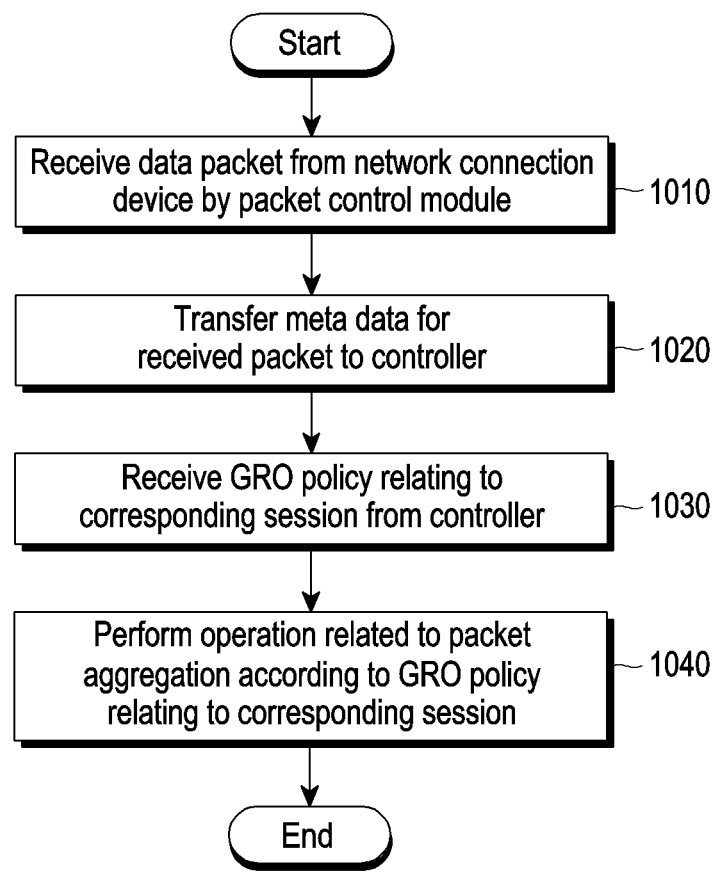
FIG. 10 is a flowchart illustrating an operation of processing a data packet in an electronic device according to an embodiment of the disclosure.

FIG. 10 illustrates a flow of an operation for processing a packet in an electronic device according to an embodiment of the disclosure.

Referring to FIG. 10, according to various embodiments of the disclosure, the packet control module (e.g., the packet control module 330 of FIG. 3) of the electronic device 101 (e.g., the processor 120 of the electronic device 101) may be configured to receive a packet form an NIC (e.g., the network connection device 211 of FIG. 2) in operation 1010.

According to various embodiments of the disclosure, the packet control module of the electronic device may be configured to transmit meta data for the received packet to the controller 310 in operation 1020.

According to various embodiments of the disclosure, the packet control module of the electronic device may be configured to receive a GRO policy (e.g., a policy related to packet aggregation) for a corresponding session from the controller in operation 1030.

According to various embodiments of the disclosure, the packet control module of the electronic device may be configured to perform or adjust the operation of the GRO engine (e.g., the GRO engine 341 of the packet aggregation module 233) according to the GRO policy for the corresponding session received from the controller, in operation 1040. For example, the packet control module may be configured to perform processing of aggregating corresponding packets according to the received GRO policy, perform control to flush buffers for the corresponding session, or perform control to flush all GRO buffers 342.

Figure 11:
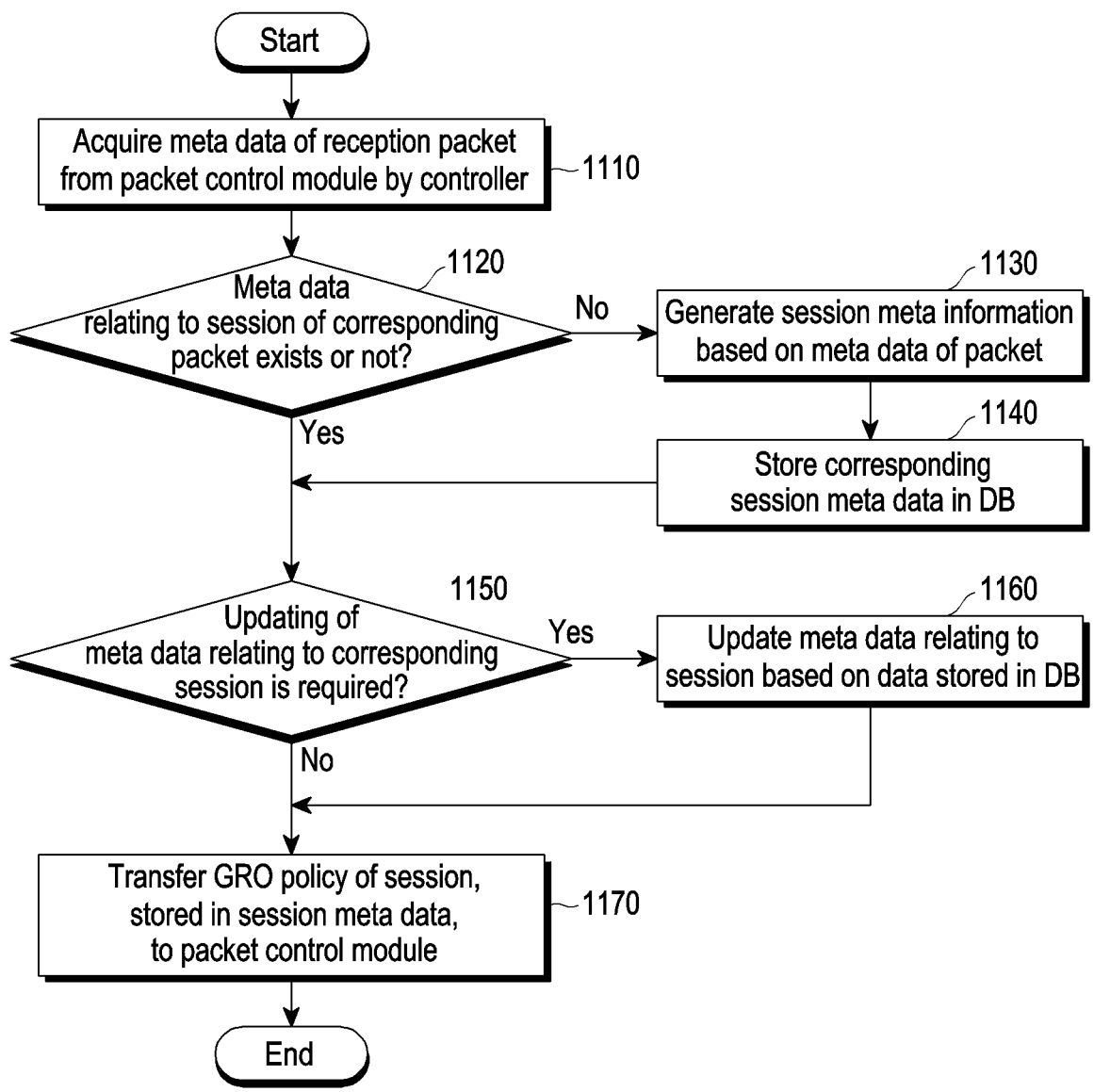
FIG. 11 is a flowchart illustrating an operation of processing a data packet in an electronic device according to an embodiment of the disclosure.

FIG. 11 illustrates a flow of an operation for processing a packet in an electronic device according to an embodiment of the disclosure.

Referring to FIG. 11, according to various embodiments of the disclosure, the controller 310 of the electronic device 101 (e.g., the processor 120 of the electronic device 101) may be configured to acquire meta data of the received packet from a packet control module (e.g., the packet control module of FIG. 3) in operation 1110.

According to various embodiments of the disclosure, the controller 310 may be configured to identify whether meta data for the session of the corresponding packet exists, in operation 1120. For example, the controller 310 may be configured to identify information stored in the database to identify whether meta data for the session of the corresponding packet exists. As a result of the identification, when meta data for the session of the corresponding packet does not exist ('No' in operation 1120), the controller may be configured to generate policy information related to packet aggregation for the corresponding session based on the meta data of the received packet in operation 1130. The controller may be configured to store the generated session meta data in the database 320 in operation 1140.

According to various embodiments of the disclosure, when it is determined that meta data for the session of the corresponding packet exists ('Yes' in operation 1120) in operation 1120, or when the corresponding session meta data is generated and stored in operation 1140, the controller may be configured to determine whether the update of meta data for the session is required in operation 1150. The condition for determining whether the update of the meta data is required may include at least one of a case in which the information update time for a session exceeds a configured time, a case in which the number of packets for the session exceeds the configured number, a case in which information update on the session metadata is determined as required by an external service through the pattern analysis of transmission and reception packets, or a case of new session. As a result of the determination, when the update of the meta data for the session of the corresponding packet is determined as required ('Yes' in operation 1150), the controller may be configured to update the meta data for the session based on the data stored in the database 320 in operation 1160.

When it is determined that update of the meta data for the session of the corresponding packet is not required ('No' in operation 1150) or when the corresponding session meta data is updated in operation 1160, the controller may be configured to transmit a session GRO policy (e.g., a policy related to packet aggregation) stored in meta data for the session of the corresponding packet to the packet control module in operation 1170.

Figure 12A:
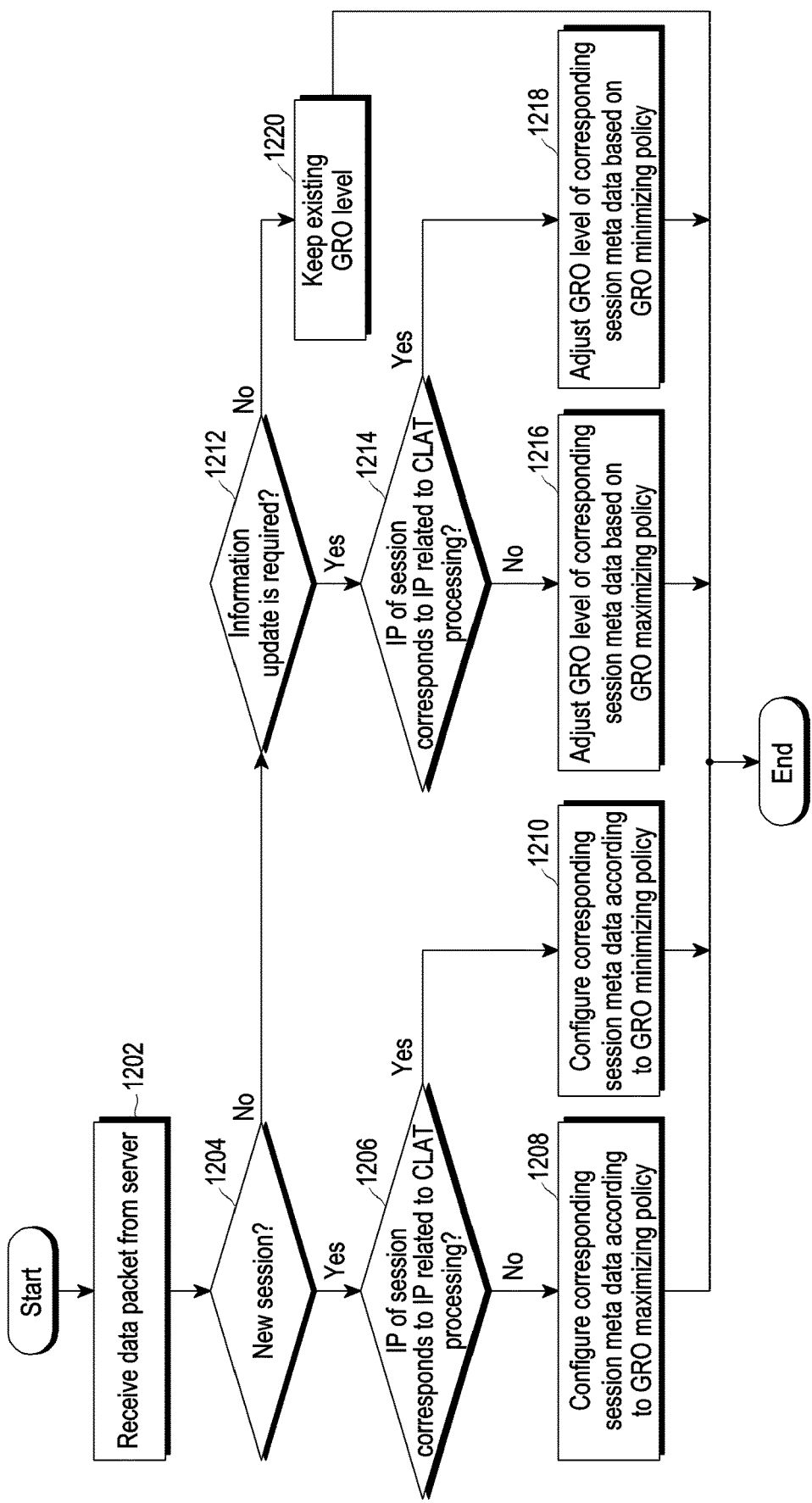
FIGS. 12A and 12B are flowcharts illustrating an operation of processing a data packet in an electronic device according to various embodiments of the disclosure.

FIG. 12A illustrates a flow of an operation for processing a packet in an electronic device according to an embodiment of the disclosure.

Referring to FIG. 12A, the electronic device 101 (e.g., the processor 120 of the electronic device 101) may be configured to receive a data packet from a server through the network connection device 211 in operation 1202.

According to various embodiments of the disclosure, the electronic device 101 may be configured to determine whether a session corresponding to the received packet is a new session in operation 1204. As a result of the determination, when it is determined that the session corresponding to the received packet is a new session ('Yes' in operation 1204), the electronic device may be configured to determine whether the IP of the corresponding session is an IP related to CLAT processing in operation 1206. According to various embodiments of the disclosure, the IP of the electronic device may be identified by determining whether the IP of the corresponding session is an IP related to CLAT processing. When the IP of the electronic device is identified, the electronic device may be configured to determine whether the IP of the server having transmitted the packet, which has been received through the session, and the IP of the electronic device are of the same type or different types of IP.

According to various embodiments of the disclosure, the electronic device 101 may be configured to determine a case, in which the CLAT-related IP stored in the database and the destination IP of the corresponding session are the same, as an IP of a session related to CLAT processing. According to various embodiments of the disclosure, as a result of the determination, when the IP of the corresponding session is not the IP related to CLAT processing ('No' in operation 1206), the electronic device may configure the GRO level according to the GRO maximizing policy of meta data of the corresponding session in operation 1208. As a result of the determination, when the IP of the corresponding session is the IP related to CLAT processing ('Yes' in operation 1206), the electronic device may configure the GRO level of the corresponding session meta data according to the GRO minimizing policy in operation 1210.

According to various embodiments of the disclosure, as a result of the determination in operation 1204, when it is determined that a session corresponding to the received packet is not a new session ('No' in operation 1204), the electronic device may be configured to determine whether information update is required in operation 1212. As a result of the determination, when it is determined that the information update is not necessary ('No' in operation 1212), the existing GRO level may be maintained in operation 1220.

According to various embodiments of the disclosure, as a result of the determination in operation 1212, when it is determined that information update is necessary ('Yes' in operation 1212), the electronic device may be configured to determine whether the IP of the corresponding session is an IP related to CLAT processing in operation 1214. According to various embodiments of the disclosure, as a result of the determination, when the IP of the corresponding session is not an IP related to CLAT processing ('No' in operation 1214), the electronic device may be configured to adjust the GRO level of the corresponding session meta data based on a GRO policy for non-CLAT in operation 1216. As a result of the determination, when the IP of the corresponding session is an IP related to CLAT processing ('Yes' in operation 1214), the electronic device may be configured to update the GRO level of the corresponding session meta data based on a GRO policy for CLAT in operation 1218. According to various embodiments of the disclosure, the GRO policy of non-CLAT in operation 1216 may be the same as the GRO maximizing policy in operation 1208, and the GRO policy for CLAT in operation 1218 may also be the same as the GRO minimizing policy in operation 1210.

Figure 12B:
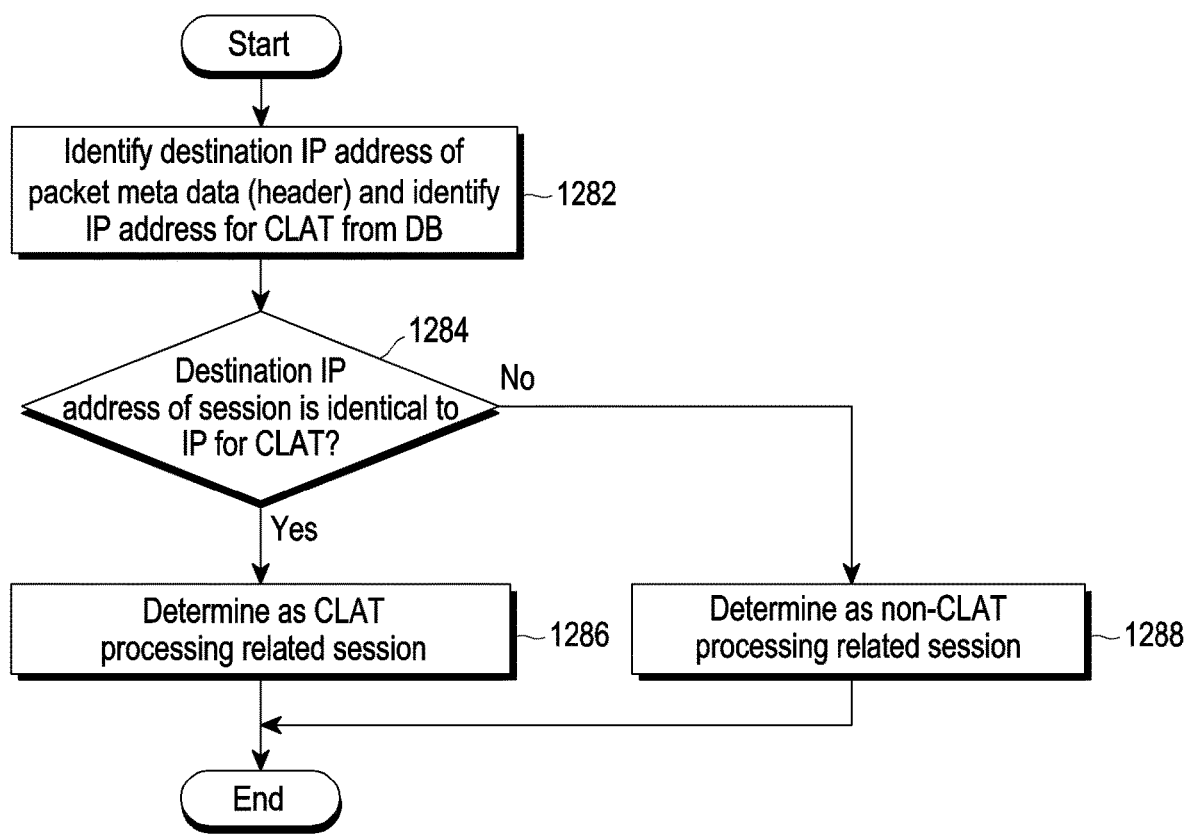

FIG. 12B illustrates a flow of an operation for processing a packet in an electronic device according to an embodiment of the disclosure.

Referring to FIG. 12B, the electronic device 101 (e.g., the processor 120 of the electronic device 101) may be configured to receive a data packet from a server through the network connection device 211. In operation 1282, the electronic device may be configured to identify meta data of the received packet to identify a destination IP address, and identify the IP address for CLAT from the database.

In operation 1284, the electronic device may be configured to identify whether the destination IP address of the session is the same as the IP for CLAT. As a result of the identification, when the destination IP address of the session is the same as the IP for CLAT ('Yes' in operation 1284), the electronic device may be configured to determine the corresponding session as a CLAT processing-related session (i.e., a session for performing CLAT processing on a received packet) in operation 1286. As a result of the identification, when the destination IP address of the session is different from the IP for CLAT ('No' in operation 1284), the electronic device may be configured to determine that the corresponding session is not a CLAT processing related session in operation 1288.

Figure 13:
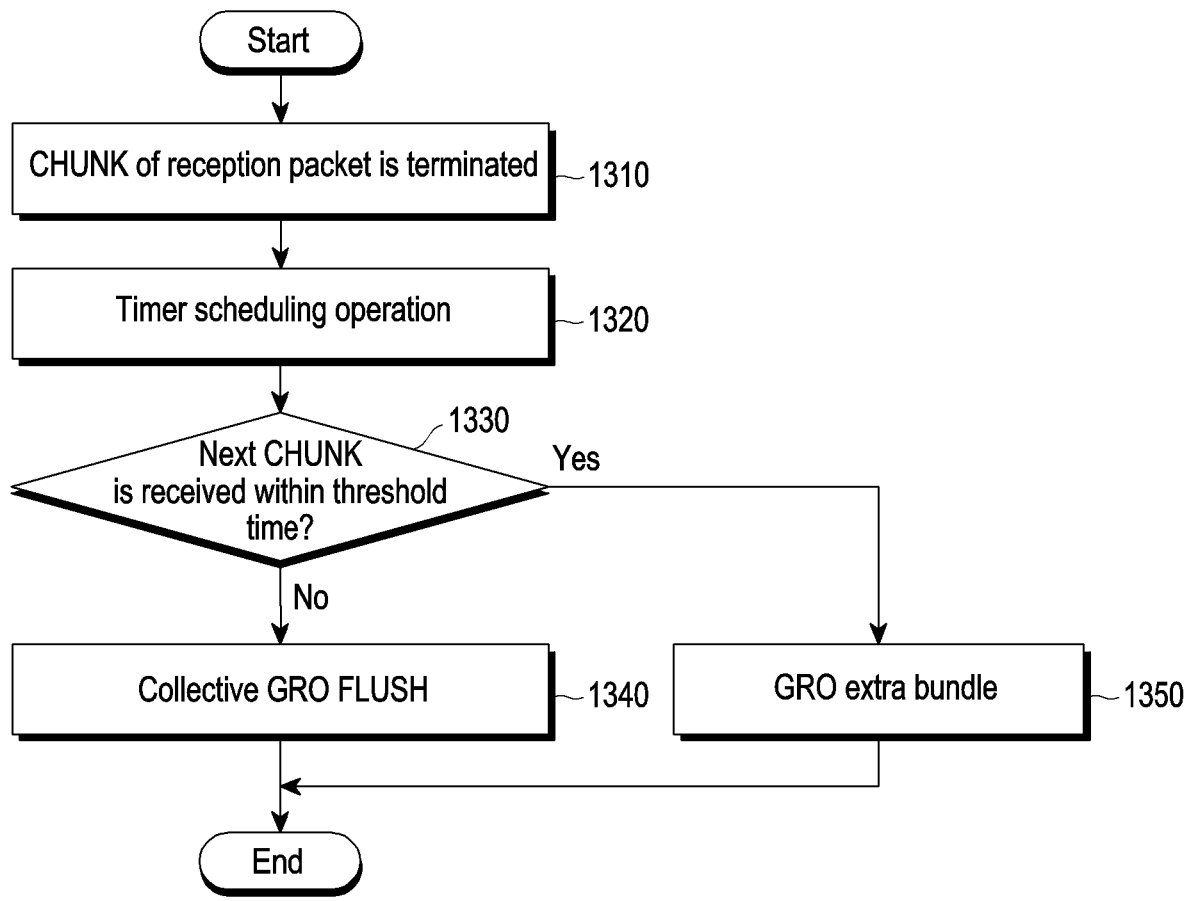
FIG. 13 is a flowchart illustrating an operation of processing a data packet in an electronic device according to an embodiment of the disclosure.

FIG. 13 illustrates a flow of an operation for processing a packet in an electronic device according to an embodiment of the disclosure.

Referring to FIG. 13, when it is determined that a chunk of a received packet is terminated in operation 1310, the electronic device 101 (e.g., the processor 120 of the electronic device 101) may be configured to operate a designated timer schedule in operation 1320. The chunk may imply a unit of data processed in one context configured so that hardware (e.g., the network connection device 211 of FIG. 2) in the electronic device 101 may receive and process a packet at a time.

According to various embodiments of the disclosure, the electronic device 101 may be configured to determine whether data of the next chunk is received within a threshold time according to the operated timer schedule, in operation 1330. As a result of the determination, when data of the next chunk is received within the threshold time of the timer schedule ('Yes' in operation 1330), the electronic device 101 may be configured to aggregate (e.g., GRO extra bundle) the received data of the next chunk with data of the previously terminated chunk in operation 1350. As a result of the determination, when the data of the next chunk is not received within the threshold time ('No' in operation 1330), the electronic device 101 may be configured to collectively flush (e.g., a GRO flush) the data in the received previously terminated chunk even when there is no flush indication, in operation 1340.

A method for processing a received data packet in the electronic device 101 according to any one of various embodiments may include receiving a data packet from a network connection device, identifying characteristics of a session corresponding to the received data packet based on header information of the received data packet, identifying information related to packet aggregation configured in response to the identified characteristics of the session, and aggregating data packets received from the network connection device or flushing the data packets to a network stack based on the identified information related to the packet aggregation.

According to various embodiments of the disclosure, the characteristics of the session may include at least one of an IP or IP type of a server having transmitted the data packet, an IP or IP type of the electronic device having received the data packet, whether the session requires conversion of the IP type, a type of a reception interface corresponding to a session, an IP that has established a session, an application that has established a session, a type of protocol for transmission and reception of the data packet, or a processing interval of a protocol for transmission and reception of the data packet.

According to various embodiments of the disclosure, the information related to packet aggregation may include at least one of information indicating to aggregate a currently received packet with at least one previously received packet, information indicating to flush at least one previously received packet stored in a buffer to the network stack, or information indicating to transmit the currently received packet to the network stack instead of aggregating the currently received packet with the previously received packet.

According to various embodiments of the disclosure, the method may further include determining whether or not updating of information related to packet aggregation configured in response to the characteristics of the session is required, when, as a result of the determination, the information update is determined as required, identifying meta data of a data packet corresponding to the session, and updating information related to the packet aggregation based on the identified meta data.

According to various embodiments of the disclosure, the information related to packet aggregation may be configured according to a first packet aggregation policy in case that the IP type of the server to which the data packet is transmitted is the same as the IP type of the electronic device according to the characteristics of the session, and configured according to a second packet aggregation policy in case that the IP type of the server to which the data packet is transmitted is different from the IP type of the electronic device according to the characteristics of the session.

According to various embodiments of the disclosure, the information related to packet aggregation may be configured such that the rate at which the number of data packets to be aggregated increases is faster, with regard to an application that has a relatively large amount of received data per unit time according to the characteristics of the session.

According to various embodiments of the disclosure, the information related to packet aggregation may be configured such that the number of data packets to be aggregated is small, with regard to an application having a relatively high need for low latency according to the characteristics of the session.

A method for processing a received data packet in the electronic device 101 according to any one of various embodiments may include receiving a data packet from a network connection device, identifying an Internet protocol (IP) type of a server based on header information of the received data packet, identifying information related to packet aggregation configured in response to the identified IP type of the server and an IP type of the electronic device, and aggregating data packets received from the network connection device or flushing the data packets to a network stack based on the identified information related to the packet aggregation.

According to various embodiments of the disclosure, the information related to packet aggregation may be configured according to a first packet aggregation policy in case that the IP type of the server to which the data packet is transmitted is the same as the IP type of the electronic device according to the characteristics of the session, and configured according to a second packet aggregation policy in case that the IP type of the server to which the data packet is transmitted is different from the IP type of the electronic device according to the characteristics of the session.

According to various embodiments of the disclosure, the method may further include identifying whether a data packet of a next chunk is received within a preconfigured period of time, and when, as a result of the identification, the data packet of the next chunk is not received within the preconfigured period of time, flushing pre-aggregation processed data packets to the network stack.

Figure 14A:
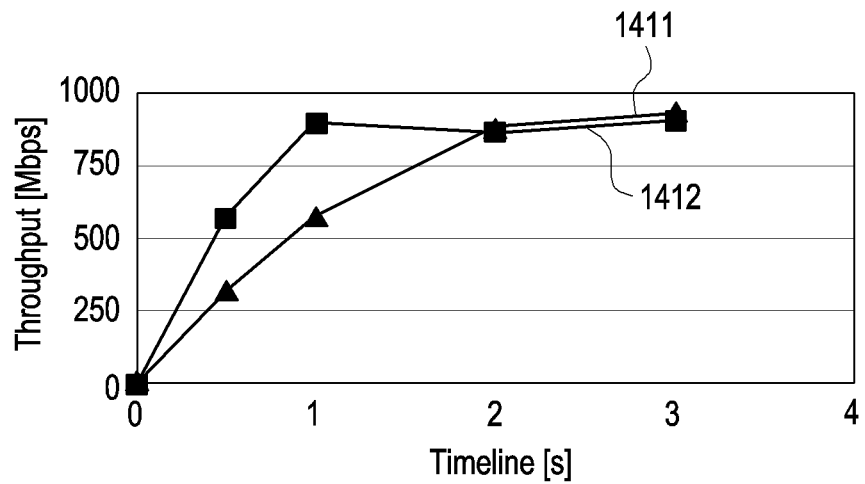
FIGS. 14A and 14B illustrate examples of packet processing performance in an electronic device according to various embodiments of the disclosure.
Figure 14B:
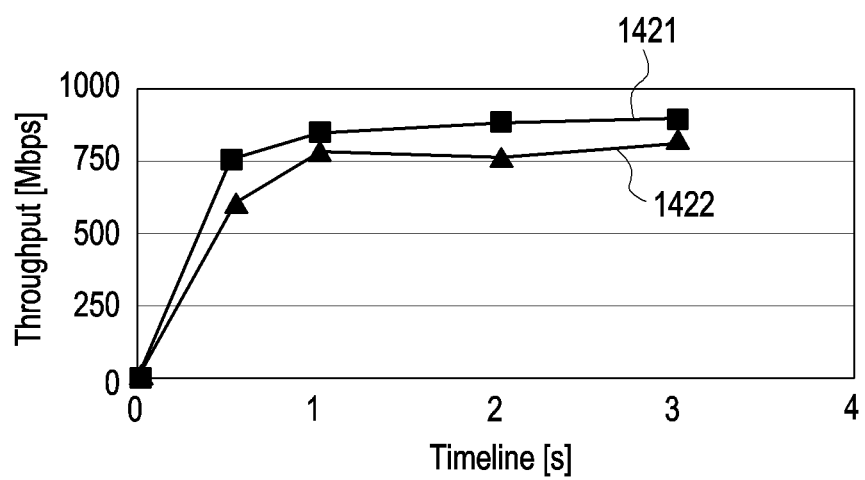

FIGS. 14A and 14B illustrate examples of packet processing performance in an electronic device according to various embodiments of the disclosure.

FIG. 14A is a graph showing a comparison of an early stage performance (e.g., up to 3 seconds after starting reception) when the electronic device 101 receives a data packet, in case that the IP type of a server is IPv6 and the IP type of the electronic device 101 of a terminal is IPv6 and thus the server and the electronic device have the same IP type.

Referring to FIG. 14A, in connection with an early stage performance of a session, it may be seen that a received data packet throughput 1411 according to an embodiment of the disclosure is superior to a received data packet throughput 1412 according to a comparative example of the prior art.

FIG. 14B is a graph showing a comparison of an early stage performance (e.g., up to 3 seconds after starting reception) when the electronic device 101 receives a data packet, in case that the IP type of the server is IPv4 and the IP type of the electronic device 101 is IPv6, and thus the IP types are different from each other.

Referring to FIG. 14B, in connection with an early stage performance of a session, it may be seen that a received data packet throughput 1421 according to an embodiment of the disclosure is superior to a received data packet throughput 1422 according to a comparative example of the prior art.

Figure 15:
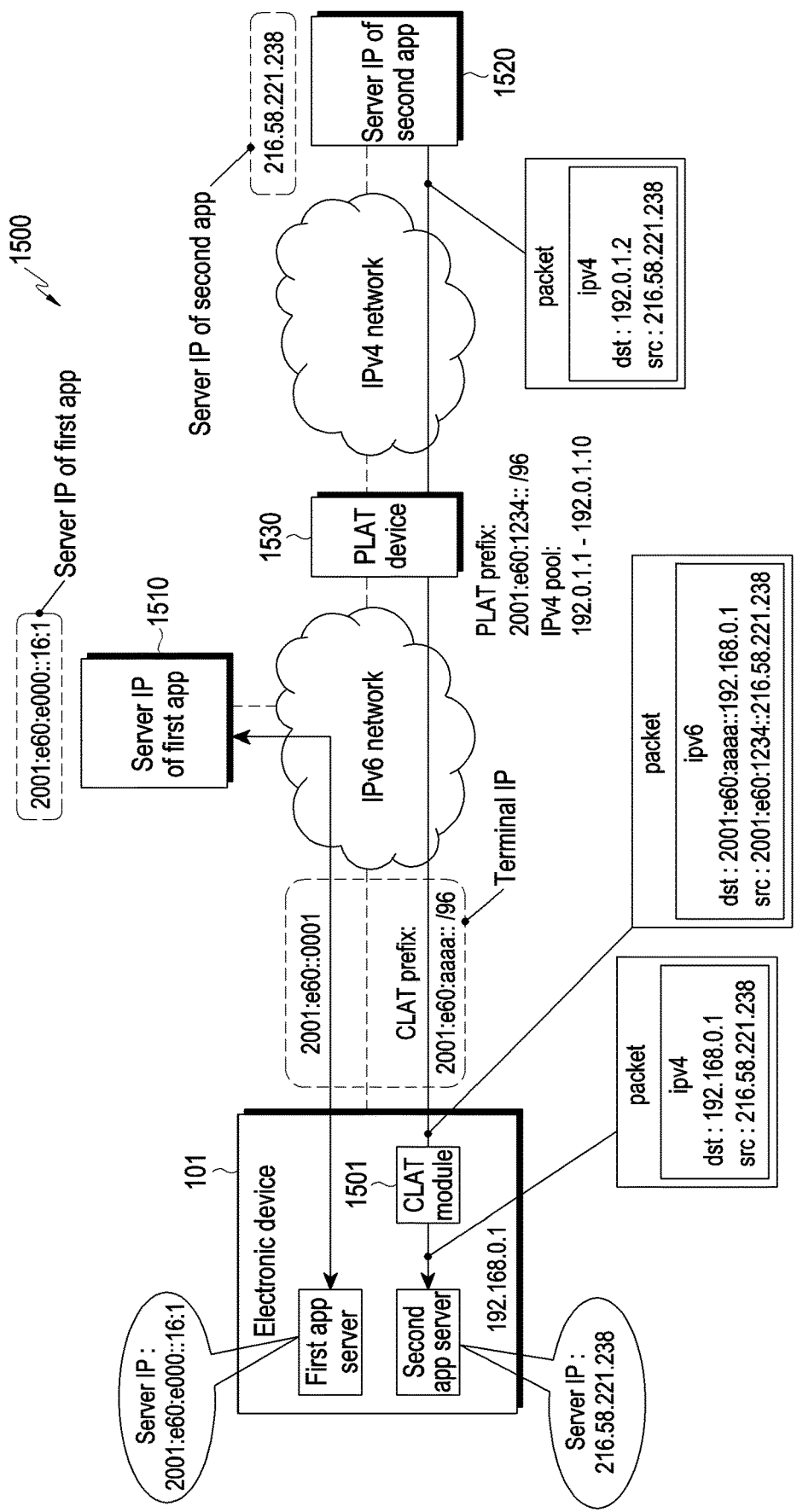
FIG. 15 illustrates a network configuration according to an embodiment of the disclosure.

FIG. 15 illustrates an example of a network configuration according to an embodiment of the disclosure.

Referring to FIG. 15, a network 1500 according to various embodiments may include an electronic device 101, a first app server 1510, and a second app server 1520. According to various embodiments of the disclosure, the electronic device 101 may access the first app server 1510 by executing a first app, and may access the second app server 1520 by executing as second app.

According to various embodiments of the disclosure, the first app server 1510 may generate an IPv6 packet and transmit the generated IPv6 packet to the electronic device 101 through an IPv6 network. After receiving the packet, having been transmitted from the first app server 1510, through the IPv6 network, the electronic device 101 may process the received packet in the first app without going through a CLAT module 1501. According to various embodiments of the disclosure, the electronic device 101 may be configured to determine the IP of the electronic device 101 and the IP of the first app server 1510 as the same type of IP, in relation to a session which is established with the first app server 1510. As described above, the electronic device 101 may apply a policy related to packet aggregation configured based on the determination.

According to various embodiments of the disclosure, the second app server 1520 may generate an IPv4 packet and transmit the generated IPv4 packet to the electronic device 101 through an IPv4 network and an IPv6 network. Here, a provider side translator (PLAT) device 1530 may convert the IP type from IPv4 to IPv6 so that the IPv4 packet, having been transmitted from the second app server 1520, is transmitted through the IPv6 network. The electronic device 101 may be configured to receive the packet, having been transmitted from the second app server 1520 and converted into IPv6, through the IPv6 network, and then may convert the IPv4 packet into the IPv4 packet through the CLAT module 1501. According to various embodiments of the disclosure, the electronic device 101 may be configured to determine the IP of the electronic device 101 and the IP of the second app server 1520 as different types of IPs, since a packet received for a session, which is established with the second app server 1520, is processed by the CLAT module 1501. As described above, the electronic device 101 may apply a policy related to packet aggregation configured based on the determination.

Figure 16:
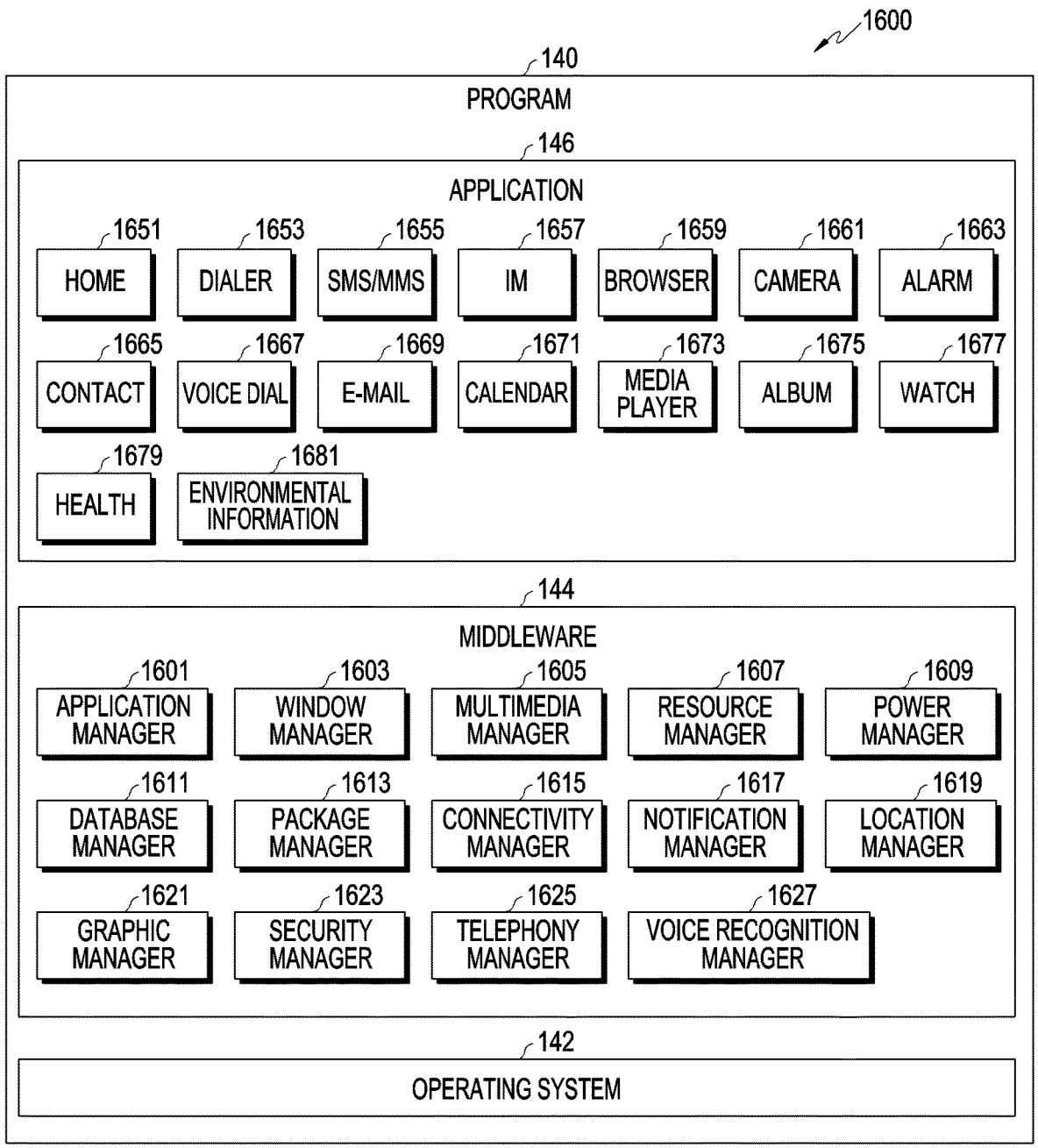
FIG. 16 is a block diagram illustrating a program according to an embodiment of the disclosure.

FIG. 16 is a block diagram 1600 illustrating a program according to an embodiment of the disclosure.

Referring to FIG. 16, according to an embodiment of the disclosure, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 1601, a window manager 1603, a multimedia manager 1605, a resource manager 1607, a power manager 1609, a database manager 1611, a package manager 1613, a connectivity manager 1615, a notification manager 1617, a location manager 1619, a graphic manager 1621, a security manager 1623, a telephony manager 1625, or a voice recognition manager 1627.

The application manager 1601, for example, may manage the life cycle of the application 146. The window manager 1603, for example, may manage one or more graphical user interface (GUI) resources that are used on a screen. The multimedia manager 1605, for example, may identify one or more formats to be used to play media files, and may encode or decode a corresponding one of the media files using a codec appropriate for a corresponding format selected from the one or more formats. The resource manager 1607, for example, may manage the source code of the application 146 or a memory space of the memory 130. The power manager 1609, for example, may manage the capacity, temperature, or power of the battery 189, and determine or provide related information to be used for the operation of the electronic device 101 based at least in part on corresponding information of the capacity, temperature, or power of the battery 189. According to an embodiment of the disclosure, the power manager 1609 may interwork with a basic input/output system (BIOS) (not shown) of the electronic device 101.

The database manager 1611, for example, may generate, search, or change a database to be used by the application 146. The package manager 1613, for example, may manage installation or update of an application that is distributed in the form of a package file. The connectivity manager 1615, for example, may manage a wireless connection or a direct connection between the electronic device 101 and the external electronic device. The notification manager 1617, for example, may provide a function to notify a user of an occurrence of a specified event (e.g., an incoming call, message, or alert). The location manager 1619, for example, may manage locational information on the electronic device 101. The graphic manager 1621, for example, may manage one or more graphic effects to be offered to a user or a user interface related to the one or more graphic effects.

The security manager 1623, for example, may provide system security or user authentication. The telephony manager 1625, for example, may manage a voice call function or a video call function provided by the electronic device 101. The voice recognition manager 1627, for example, may transmit a user's voice data to the server 108, and receive, from the server 108, a command corresponding to a function to be executed on the electronic device 101 based at least in part on the voice data, or text data converted based at least in part on the voice data. According to an embodiment of the disclosure, the middleware 1644 may dynamically delete some existing components or add new components. According to an embodiment of the disclosure, at least part of the middleware 144 may be included as part of the OS 142 or may be implemented as another software separate from the OS 142.

The application 146 may include, for example, a home 1651, dialer 1653, a short message service (SMS)/multimedia messaging service (MMS) 1655, an instant message (IM) 1657, a browser 1659, a camera 1661, an alarm 1663, a contact 1665, a voice recognition 1667, an email 1669, a calendar 1671, a media player 1673, an album 1675, a watch 1677, health 1679 (e.g., for measuring the degree of workout or biometric information, such as blood sugar), or environmental information 1681 (e.g., for measuring air pressure, humidity, or temperature information) application. According to an embodiment of the disclosure, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 1669) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus of the display device 160 or the camera module 180) of the external electronic device communicating with the electronic device 101 or some components thereof. The device management application, additionally or alternatively, may support installation, delete, or update of an application running on the external electronic device.

The electronic device according to various embodiments may be one of various types of electronic devices. The electronic devices may include, for example, a computer device, a portable communication device (e.g., a smartphone), a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., a master device or a task performing device). For example, a processor of the machine (e.g., a master device or a task performing device) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. An electronic device comprising:
a network connection device;
memory storing one or more computer programs; and
one or more processors communicatively coupled to the network connection device and the memory,
wherein the one or more computer programs include computer-executable instructions which, when executed by the one or more processors, cause the electronic device to:
identify header information of a data packet received from a server using the network connection device,
based on the header information of the data packet, identify an Internet protocol (IP) type of the server,
aggregate data packets received from the network connection device or flush the data packets to a network stack according to a first packet aggregation policy, based on identifying that the IP type of the server is a same IP type as an IP type of the electronic device, and
aggregate the data packets received from the network connection device or flush the data packets to the network stack according to a second packet aggregation policy, based on identifying that the IP type of the server is different from the IP type of the electronic device.

2. The electronic device of claim 1, wherein the one or more computer programs further include computer-executable instructions which, when executed by the one or more processors, cause the electronic device to:
determine whether the IP type of the server is the same IP type as the IP type of the electronic device based on whether a destination IP address of the data packet is a same IP address as an IP address for a customer side translator (CLAT).

3. The electronic device of claim 1, wherein the one or more computer programs further include computer-executable instructions which, when executed by the one or more processors, cause the electronic device to:
identify whether a data packet of a next chunk is received within a preconfigured period of time; and
based on identifying that the data packet of the next chunk is not received within the preconfigured period of time, flush pre-aggregation processed data packets to the network stack.

4. The electronic device of claim 1,
wherein the one or more computer programs further include computer-executable instructions which, when executed by the one or more processors, cause the electronic device to:
based on information related to packet aggregation, aggregate the data packets received from the network connection device or flush the data packets to the network stack, and wherein the information related to packet aggregation comprises at least one of:
information indicating to aggregate a currently received packet with at least one previously received packet;
information indicating to flush at least one previously received packet stored in a buffer to the network stack; or
information indicating to transmit the currently received packet to the network stack instead of aggregating the currently received packet with a previously received packet.

5. The electronic device of claim 4, wherein the one or more computer programs further include computer-executable instructions which, when executed by the one or more processors, cause the electronic device to:
determine whether updating of the information related to packet aggregation is required, the information related to packet aggregation being configured based on an application type;
based on determining that the updating of the information related to packet aggregation is required, identify meta data of a data packet corresponding to a session; and
based on the meta data, update the information related to packet aggregation.

6. The electronic device of claim 4, wherein the one or more computer programs further include computer-executable instructions which, when executed by the one or more processors, cause the electronic device to:
based on the header information of the data packet, identify characteristics of a session corresponding to the data packet; and
based on the characteristics of the session, identify the information related to packet aggregation.

7. The electronic device of claim 6, wherein the characteristics of the session include at least one of:
the IP type of the server having transmitted the data packet;
the IP type of the electronic device having received the data packet;
whether the session is a type of session requiring IP type conversion;
a type of a reception interface corresponding to the session;
an IP configured to generate at least one session;
an application configured to generate at least one session;
a type of a protocol configured to transmit and receive the data packet; or
a processing interval of the protocol configured to transmit and receive the data packet.

8. A method performed by an electronic device for processing a received data packet, the method comprising:
identifying, by the electronic device, header information of a data packet received from a server using a network connection device;
based on the header information of the data packet, identifying, by the electronic device, an Internet protocol (IP) type of the server;
aggregating, by the electronic device, data packets received from the network connection device or flushing, by the electronic device, the data packets to a network stack according to a first packet aggregation policy, based on identifying that the IP type of the server is a same IP type as an IP type of the electronic device; and
aggregating, by the electronic device, the data packets received from the network connection device or flushing, by the electronic device, the data packets to the network stack according to a second packet aggregation policy, based on identifying that the IP type of the server is different from the IP type of the electronic device.

9. The method of claim 8, further comprising:
determining, by the electronic device, whether the IP type of the server is the same IP type as the IP type of the electronic device based on whether a destination IP address of the data packet is a same IP address as an IP address for a customer side translator (CLAT).

10. The method of claim 8, further comprising:
identifying, by the electronic device, whether a data packet of a next chunk is received within a preconfigured period of time; and
based on identifying that the data packet of the next chunk is not received within the preconfigured period of time, flushing, by the electronic device, pre-aggregation processed data packets to the network stack.

11. The method of claim 8, further comprising:
based on information related to packet aggregation, aggregating, by the electronic device, the data packets received from the network connection device or flushing, by the electronic device, the data packets to the network stack,
wherein the information related to packet aggregation comprises at least one of:
information indicating to aggregate a currently received packet with at least one previously received packet;
information indicating to flush at least one previously received packet stored in a buffer to the network stack; or
information indicating to transmit the currently received packet to the network stack instead of aggregating the currently received packet with a previously received packet.

12. The method of claim 11, further comprising:
determining, by the electronic device, whether updating of the information related to packet aggregation is required, the information related to packet aggregation being configured based on an application type;

based on determining that the updating of the information related to packet aggregation is required, identifying, by the electronic device, meta data of a data packet corresponding to a session; and based on the meta data, updating, by the electronic device, the information related to packet aggregation.

13. The method of claim 11, further comprising:

based on header information of the received data packet, identifying, by the electronic device, characteristics of a session corresponding to the data packet; and based on the characteristics of the session, identifying, by the electronic device, the information related to packet aggregation.

14. One or more non-transitory computer readable storage media storing one or more computer programs including computer-executable instructions which, when executed by one or more processors of an electronic device, cause the electronic device to perform operations, the operations comprising:

identifying, by the electronic device, header information of a data packet received from a server using a network connection device;

based on the header information of the data packet, identifying, by the electronic device, an Internet protocol (IP) type of the server;

aggregating, by the electronic device, data packets received from the network connection device or flushing, by the electronic device, the data packets to a network stack according to a first packet aggregation policy, based on identifying that the IP type of the server is a same IP type as an IP type of the electronic device; and aggregating, by the electronic device, the data packets received from the network connection device or flushing, by the electronic device, the data packets to the network stack according to a second packet aggregation policy, based on identifying that the IP type of the server is different from the IP type of the electronic device.

15. The one or more non-transitory computer readable storage media of claim 14, the operations further comprising:

determining, by the electronic device, whether the IP type of the server is the same IP type as the IP type of the electronic device based on whether a destination IP address of the data packet is a same IP address as an IP address for a customer side translator (CLAT).

16. The one or more non-transitory computer readable storage media of claim 14, the operations further comprising:

identifying, by the electronic device, whether a data packet of a next chunk is received within a preconfigured period of time; and based on identifying that the data packet of the next chunk is not received within the preconfigured period of time, flushing, by the electronic device, pre-aggregation processed data packets to the network stack.

17. The one or more non-transitory computer readable storage media of claim 14, the operations further comprising:

based on information related to packet aggregation, aggregating, by the electronic device, the data packets received from the network connection device or flushing, by the electronic device, the data packets to the network stack, wherein the information related to packet aggregation comprises at least one of:
information indicating to aggregate a currently received packet with at least one previously received packet;
information indicating to flush at least one previously received packet stored in a buffer to the network stack; or
information indicating to transmit the currently received packet to the network stack instead of aggregating the currently received packet with a previously received packet.

18. The one or more non-transitory computer readable storage media of claim 17, the operations further comprising:

determining, by the electronic device, whether updating of the information related to packet aggregation is required, the information related to packet aggregation being configured based on an application type;

based on determining that the updating of the information related to packet aggregation is required, identifying, by the electronic device, meta data of a data packet corresponding to a session; and based on the meta data, updating, by the electronic device, the information related to packet aggregation.

* * * * *